(12) United States Patent
Luise et al.

(10) Patent No.: US 12,332,782 B2
(45) Date of Patent: Jun. 17, 2025

(54) INTEGRATED CIRCUIT WITH ADDRESS REMAPPING CIRCUITRY TO RESPOND TO A MEMORY ACCESS REQUEST

(71) Applicant: STMicroelectronics International N.V., Geneva (CH)

(72) Inventors: Loris Luise, Ornago (IT); Fabio Giuseppe De Ambroggi, Biassono (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/188,365

(22) Filed: Mar. 22, 2023

(65) Prior Publication Data

US 2024/0320148 A1  Sep. 26, 2024

(51) Int. Cl.
*G06F 12/06* (2006.01)
*G06F 13/16* (2006.01)

(52) U.S. Cl.
CPC ........ *G06F 12/063* (2013.01); *G06F 13/1668* (2013.01); *G06F 2212/254* (2013.01)

(58) Field of Classification Search
CPC .............. G06F 12/063; G06F 13/1668; G06F 2212/254
See application file for complete search history.

(56) References Cited

U.S. PATENT DOCUMENTS

| | | | |
|---|---|---|---|
| 5,838,932 A | 11/1998 | Alzien | |
| 6,434,688 B1 | 8/2002 | Rhoden et al. | |
| 8,458,241 B2 | 6/2013 | Cho et al. | |
| 11,886,349 B2 * | 1/2024 | Dorris | G06F 12/1441 |
| 2003/0009502 A1 | 1/2003 | Katayanagi | |
| 2007/0245046 A1 | 10/2007 | Asaro et al. | |
| 2015/0067248 A1 * | 3/2015 | Yoo | G11C 29/78 |
| | | | 711/105 |
| 2021/0334213 A1 | 10/2021 | Dorris | |
| 2022/0034996 A1 | 2/2022 | Falkenberg | |
| 2022/0100521 A1 * | 3/2022 | Zhang | G06F 13/1673 |

FOREIGN PATENT DOCUMENTS

CN   113238805 A   8/2021
CN   114297570 A   4/2022

OTHER PUBLICATIONS

Guo et al., "3D-Stacked Memory-Side Acceleration: Accelerator and System Design," 2014. (6 pages).
Hong et al., "PCM-2R: Accelerating MLC PCM Writes via Data Reshaping and Remapping," Hindawi Mobile Information Systems vol. 2022, Article ID 9552517, 2022. (19 pages).
Kim et al., "Improving I/O performance in distributed file systems for flash-based SSDs by access pattern reshaping," *Future Generation Computer Systems* 115:365-373, 2021.

* cited by examiner

*Primary Examiner* — Gurtej Bansal
(74) *Attorney, Agent, or Firm* — Seed IP Law Group LLP

(57) ABSTRACT

A system on chip (SoC) includes a CPU, a main bus, and a plurality of subsystems. The SoC also includes an address remapping module coupled between the CPU and the bus. The address remapping module quickly and efficiently changes any memory addresses that need to be changed with the CPU requests a read or write operation associated with the addresses.

15 Claims, 18 Drawing Sheets

156

STAGE 2

$a_0 \longrightarrow \oplus \longrightarrow a_0 + (W_4^0 \times a_2) = b_0$ $a_1 \longrightarrow \oplus \longrightarrow a_1 + (W_4^1 \times a_3) = b_1$ $a_2 \longrightarrow \oplus \longrightarrow a_0 - (W_4^0 \times a_2) = b_2$ $a_3 \longrightarrow \oplus \longrightarrow a_1 - (W_4^1 \times a_3) = b_3$ $a_4 \longrightarrow \oplus \longrightarrow a_4 + (W_4^0 \times a_6) = b_4$ $a_5 \longrightarrow \oplus \longrightarrow a_5 + (W_4^1 \times a_7) = b_5$ $a_6 \longrightarrow \oplus \longrightarrow a_4 - (W_4^0 \times a_6) = b_6$ $a_7 \longrightarrow \oplus \longrightarrow a_5 - (W_4^1 \times a_7) = b_7$ $a_8 \longrightarrow \oplus \longrightarrow a_8 + (W_4^0 \times a_{10}) = b_8$ $a_9 \longrightarrow \oplus \longrightarrow a_9 + (W_4^1 \times a_{11}) = b_9$ $a_{10} \longrightarrow \oplus \longrightarrow a_8 - (W_4^0 \times a_{10}) = b_{10}$ $a_{11} \longrightarrow \oplus \longrightarrow a_9 - (W_4^1 \times a_{11}) = b_{11}$ $a_{12} \longrightarrow \oplus \longrightarrow a_{12} + (W_4^0 \times a_{14}) = b_{12}$ $a_{13} \longrightarrow \oplus \longrightarrow a_{13} + (W_4^1 \times a_{15}) = b_{13}$ $a_{14} \longrightarrow \oplus \longrightarrow a_{12} - (W_4^0 \times a_{14}) = b_{14}$ $a_{15} \longrightarrow \oplus \longrightarrow a_{13} - (W_4^1 \times a_{15}) = b_{15}$

FIG. 11B ical Field

The present disclosure is related to integrated circuits, and more particularly, to integrated circuits with central processing units.

Description of the Related Art

Modern computers may contain some dedicated instructions to compute different types of addressing. This may include a single instruction or a set of instructions that is a single cycle or more, respectively. Two ways to change addressing types include with software or with hardware. With software, the user simply writes the software code and the compiler of the central processing unit (CPU) does the address calculation. With hardware, the instruction set architecture (ISA) of the CPU is changed to compute the specific address calculation.

Many times, these address calculations can be a central part (limited cycles) of the application due to the many instructions needed to calculate the address. In many cases, the ISA of a CPU cannot be changed. Accordingly, it can be very difficult to provide efficient solutions for address changes.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

In one embodiment, a device includes a CPU, a bus, and a sub-system coupled to the bus. The device includes an address remapping module coupled between the CPU and the bus and a system register coupled to the address remapping module.

In one embodiment, a device includes a CPU, a bus, and a sub-system coupled to the bus. The device includes a data reshaping module coupled between the CPU and the bus a system register coupled to the data reshaping module.

In one embodiment, a device includes a CPU, a bus, and a sub-system coupled to the bus. The device includes a remapping and reshaping module coupled between the CPU and the bus and a system register coupled to the remapping and reshaping module.

In one embodiment, a device includes a CPU configured to perform an FFT process on sample data, a bus, and a memory coupled to the bus and configured to store a plurality of twiddle values associated with a FFT process. The device includes a remapping and reshaping module coupled between the CPU and the bus and configured to receive a memory access request from the CPU requesting twiddle values for an FFT process and including requested memory addresses. The remapping and reshaping module is configured to provide adjusted memory values to the bus based on the requested memory values, to receive twiddle values from the bus based on the adjusted memory values, to adjust the twiddle values, and to provide the adjusted twiddle values to the CPU. The device includes a system register coupled to the remapping and reshaping module.

In one embodiment, a method includes providing, from a CPU to an address remapping module coupled between the CPU and the bus, a memory access request including a requested memory address for accessing a memory of a sub-system coupled to the bus and comparing, with the address remapping module, the requested memory address to address matching data including a plurality of addresses. The method includes, if the requested memory address does not match any of the plurality of addresses of the address matching data, providing the requested memory address to the bus from the address remapping module. The method includes, if the requested memory address matches an address from the address matching data, retrieving an adjusted memory address from address adjustment data associated with the address matching data and providing the adjusted memory address to the bus from the address remapping module.

In one embodiment, a method includes providing, from a CPU to a data reshaping module coupled between the CPU and the bus, a memory access request including a requested memory address for accessing a memory of a sub-system coupled to the bus, receiving, with the data reshaping module from either the CPU or the memory, data associated with the memory access request, and comparing, with the data reshaping module, the requested memory address to address matching data including a plurality of addresses. The method includes if the requested memory address does not match any of the plurality of addresses of the address matching data, outputting the data from the data reshaping module without adjusting the data. The method includes if the requested memory address matches an address from the address matching data, adjusting the data associated with the requested memory address and outputting the adjusted data.

In one embodiment, a method includes providing, from a CPU to a remapping and reshaping module coupled between the CPU and the bus, a memory access request including a requested memory address for accessing a memory of a sub-system coupled to the bus and comparing, with the remapping and reshaping module, the requested memory address to address matching data including a plurality of addresses. The method includes, if the requested memory address does not match any of the plurality of addresses of the address matching data, outputting the requested memory address to the bus from the data reshaping module. The method includes, if the requested memory address matches an address from the address matching data, retrieving an adjusted memory address from address adjustment data associated with the address matching data and providing the adjusted memory address to the bus from the address remapping module and reshaping data associated with the adjusted memory address.

In one embodiment, a method includes storing, in a memory coupled to a bus, a plurality of twiddle values, receiving, from a CPU with a remapping and reshaping module coupled between the CPU and the bus, a memory access request requesting twiddle values and including requested memory addresses, and providing, with the remapping and reshaping module to the bus, an adjusted memory address based on the requested memory address. The method includes receiving, with the remapping and reshaping module from the bus, twiddle values from the memory based on the adjusted memory values, generating, with the remapping and reshaping module, adjusted twiddle values by adjusting the twiddle values, providing the adjusted twiddle values to the CPU, and performing, with the CPU, an FFT process with the adjusted twiddle values.

BRIEF DESCRIPTION OF THE SEVERAL VIEWS OF THE DRAWINGS

Reference will now be made by way of example only to the accompanying drawings. In the drawings, identical reference numbers identify similar elements or acts.

In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

FIGS. 11A-11D illustrates stages of an FFT process, in accordance with one embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
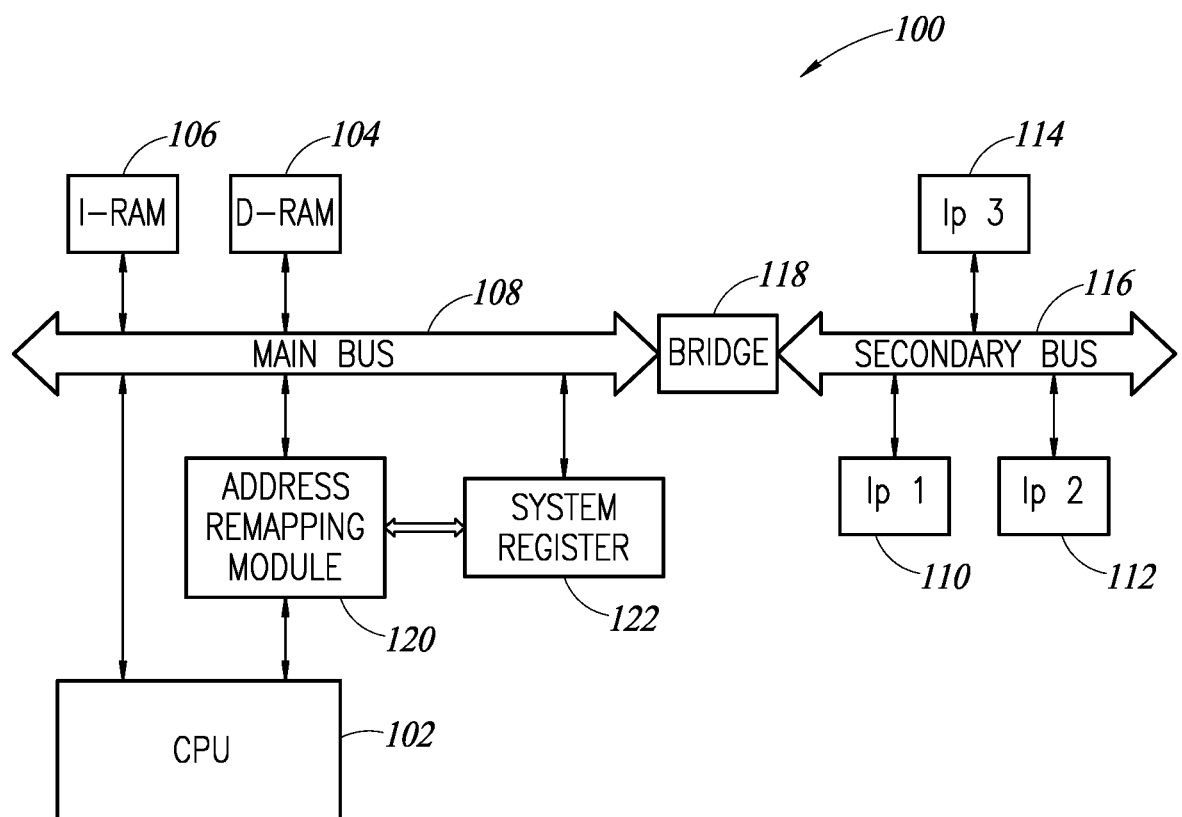
FIG. 1 is a block diagram of a system including an address remapping module, in accordance with one embodiment.

FIG. 1 is a block diagram of a system 100, in accordance with one embodiment. The system 100 may correspond to a system on chip (SoC) or another type of system in an integrated circuit. The system 100 includes a CPU 102 and an address remapping module 120, and a plurality of subsystems. As will be set forth in more detail below, the address remapping module 120 cooperates with the CPU 102 to provide effective and efficient memory address remapping for read and write operations associated with the CPU 102.

The system 100 includes a dynamic random access memory (DRAM) 104, an internal random access memory (IRAM), and a main bus 108. The main bus 108 couples the CPU 102 to the various components of the system 100. The system 100 further includes a secondary bus 116, a first subsystem (IP1) 110, a second subsystem (IP2) 112, a third subsystem (IP3) 114, and a secondary bus 116 coupled to the first, second, and third subsystems 112, 114, and 116. The secondary bus 116 may be coupled to the main bus 108 by a bridge 118. While FIG. 1 illustrates a main bus 108 and a secondary bus 116, in one embodiment, the main bus 108 may be directly connected to each of the components of the system 100 without a secondary bus.

The main bus 108 couples the CPU 102 to the various components of the system 100. For example, data and instructions may be passed between the CPU 102 and the various components of the system 100 via the main bus 108, and, in some cases via the bridge 118 and the secondary bus 116.

In one embodiment, the IRAM 106 corresponds to a static random access memory (SRAM) associated with the CPU 102. Alternatively, the IRAM 106 may include types of memory other than SRAM.

Though not shown in FIG. 1, the system 100 may also include other types of memory arrays including electrically erasable and programmable read-only memory (EEPROM). The EEPROM can include flash memory or other types of memory. Additional types of memories can also be included in the system 100 without departing from the scope of the present disclosure.

Though not shown in FIG. 1, the system 100 may also include contact pads or other types of I/O terminals. The contact pads can include terminals for receiving supply voltages, for receiving data, for providing data, and for other uses. The contact pads can be coupled to the main bus 108.

The subsystems 110, 112, and 114 can include systems or circuits that provide various functions. For example, the subsystems 110, 112, and 114 can include a digital-to-analog converter (DAC), an analog-to-digital converter (ADC), a memory array, or other types of subsystems that may be utilized in a system on-chip or other type of integrated circuit.

The CPU 102 may interact with each of the components of the system 100. In particular, the CPU 102 may read data from the DRAM 104, the IRAM 106, or from one of the subsystems 110, 112, and 114. Furthermore, the CPU 102 may write data to or otherwise provide data to the DRAM 104, the IRAM 106, or one of the subsystems 110, 112, or 114.

When the CPU 102 reads data from one of the components of the system 100, the CPU 102 may make a data request. The data request may correspond to a request to read data from one of the components of the system 100. The data request may include one or more requested addresses. The requested addresses correspond to the memory addresses within a component or memory array from which the CPU 102 desires to obtain data values. The data request may also include a size of the data being requested (a bit, a byte, a word, etc.). The CPU 102 may provide the data request via the main bus 106 and may also receive the desired data via the main bus 106.

The data request may also correspond to a request to write data or to provide data to one of the components of the system 100. In this case, the data request may also include requested addresses. The requested addresses indicate the addresses within a memory array or component to which the CPU 102 wants to write data. The data request may also include the data values to be written to the various data addresses. In many cases, the data addresses correspond to addresses within a buffer, such as a circular buffer or other type of buffer associated with one of the components of the subsystem 100.

In some cases, is beneficial to change the requested addresses for various reasons. One possible solution is to include, within the CPU 102, dedicated instructions for computing different types of addressing. This can include a single instructions or set of instructions. One way to change addressing types is via software. In this case, a user may simply write software code and the compiler of the CPU 102 can then perform the address calculation. Another possible solution to change addressing types is via hardware. This can correspond to changing the ISA of the CPU 102 to compute specific address calculations. However, in many cases it is forbidden to change the ISA of a CPU. Additionally, address calculations implemented via software may utilize unduly large amounts of computing and memory resources.

In one example, the CPU 102 may utilize an 8-tap finite impulse response (FIR) filter algorithm. This algorithm may utilize the following formula:

$$C[k] = \sum_{i=0}^{7} x[k-i] * b[i],$$

in which x are the data from an ADC, b are the coefficients of the FIR algorithm which are constant values for a dedicated FIR algorithm, and C are accumulators. For example:

$$C[7] = \sum_{i=0}^{7} x[7-i] * b[i] = x[7]*b[0] + x[6]*b[1] + x[5]*b[2] +$$
$$x[4]*b[3] + x[3]*b[4] + x[2]*b[5] + x[1]*b[6] + x[0]*b[7],$$
$$C[8] = \sum_{i=0}^{7} x[8-i] * b[i] = x[8]*b[0] + x[7]*b[1] + x[6]*b[2] +$$
$$x[5]*b[3] + x[4]*b[4] + x[3]*b[5] + x[2]*b[6] + x[1]*b[7],$$
$$\ldots$$
$$C[N] = \sum_{i=0}^{7} x[N-i] * b[i] = x[N]*b[0] + x[N-1]*b[1] +$$
$$x[N-2]*b[2] + x[N-3]*b[3] + \ldots + x[N-6]*b[6] + x[N-7]*b[7].$$

To calculate the output sample, the CPU may need to access a certain number of the most recent samples from the input. For example, if there are 8 coefficients (b0-b7) in this filter, then the CPU may need to utilize eight of the most recent samples from the input signal x[n], x[n−1], ... x[n−7]. These eight samples are stored in memory and continually updated as new samples are obtained. It may be beneficial to manage the stored samples in a circular buffer.

Managing the addressing in the circular buffer can be accomplished via software code. Such software code can include a loop that runs for a plurality of cycles. In the cycles, an address coefficient can be loaded, data can be loaded, a multiply and accumulate operation can be performed, data addresses can be compared and incremented, and addresses can then be reset. In the example of an 8-tap FIR filter, such software may utilize nearly 70 cycles. This is computationally expensive. The example of a FIR filter is provided to assist in understanding the complexities that can be associated with changing memory addresses in even simple operations performed by a CPU.

In one embodiment, the system 100 implements a solution that overcomes the drawbacks of other potential solutions. In particular, the system 100 utilizes an address remapping module 120 and a system register 122 to efficiently and effectively adjust addresses associated with data requests from the CPU 102.

The address remapping module 120 corresponds to a hardware circuit implemented in the system 100 between the CPU 102 and the main bus 108. The system register 122 also corresponds to a hardware circuit coupled to the address remapping module 120 and the main bus 108.

When the CPU 102 makes a data request to read data from or write data to a component of the system 100, the data request is provided to the address remapping module 120. As set forth previously, the data request can include a size of the data and requested addresses corresponding to the memory addresses from which data is to be read or to which data is to be written. The address remapping module receives the requested addresses, compares the requested addresses to a set of matching addresses for which changes should be made, and then changes the requested addresses if the requested addresses match the matching addresses from the set of addresses. The address remapping module 120 then provides the requested addresses (if no changes are to be made) or the adjusted addresses (if changes are to be made) to the main bus 108. The main bus 108 then provides the data request including the changed or unchanged addresses to the desired subsystem of the system 100.

In one embodiment, the system register stores a set of matching addresses. The set of matching addresses includes a list of memory addresses for which changes should be made. The system register 122 may also store a set of adjusted addresses associated with the matching addresses. The adjusted addresses can include, for each address in the matching addresses, an adjusted address indicating the address to which the matching address should be changed.

When the data request is received by the address remapping module 120, the address remapping module 120 may provide an update request to the system register 122. The update request indicates to the system register 122 that requested addresses have been or will be received from the CPU 102. The system register 122 provides a list of matching addresses and a list of adjusted addresses to the address remapping module 120 in response to the update request.

After receiving the matching addresses and the adjusted addresses, the address remapping module 120 compares each of the requested addresses from the CPU 102 to the matching addresses received from the system register 122. If a requested address matches an address in the matching addresses, then the address remapping module replaces the requested address with an adjusted address associated with the matching address. The address remapping module 120 then passes on the adjusted address to the main bus 108.

The address remapping module 120, in conjunction with the system register 122, can catch all valid addresses and in the case of matching addresses, can remap the addresses with previously calculated addresses. The address remapping module 120, in conjunction with the system register 122 can implement circular buffers, buffers for convolution operations, bit reverse addressing, or other types of addressing changes. Because the changed addresses are precalculated and stored in the system register 122, the address remapping module 120 can quickly and efficiently update any addresses that need to be changed. This overcomes the drawbacks of implementing software instructions that may utilize many processing cycles and computing resources to perform addressing changes. Furthermore, this overcomes the drawbacks of hardware solutions for cases in which the CPU 102 does not permit updating the ISA.

Additionally, the address remapping module 120 and the system register 122 do not consume large amounts of area. In one embodiment, the address remapping module 120 can include a relatively small amount of comparison circuits and logic circuits, taking up a very small amount of area in the SoC or other chip architecture. Additionally, the system register 122 may simply include various registers or buffers for storing lists of addresses, buffer sizes, strides, start addresses, and end addresses. Both the remapping module 120 and the system register 122 are expensive in terms of area and computation time.

Figure 2:
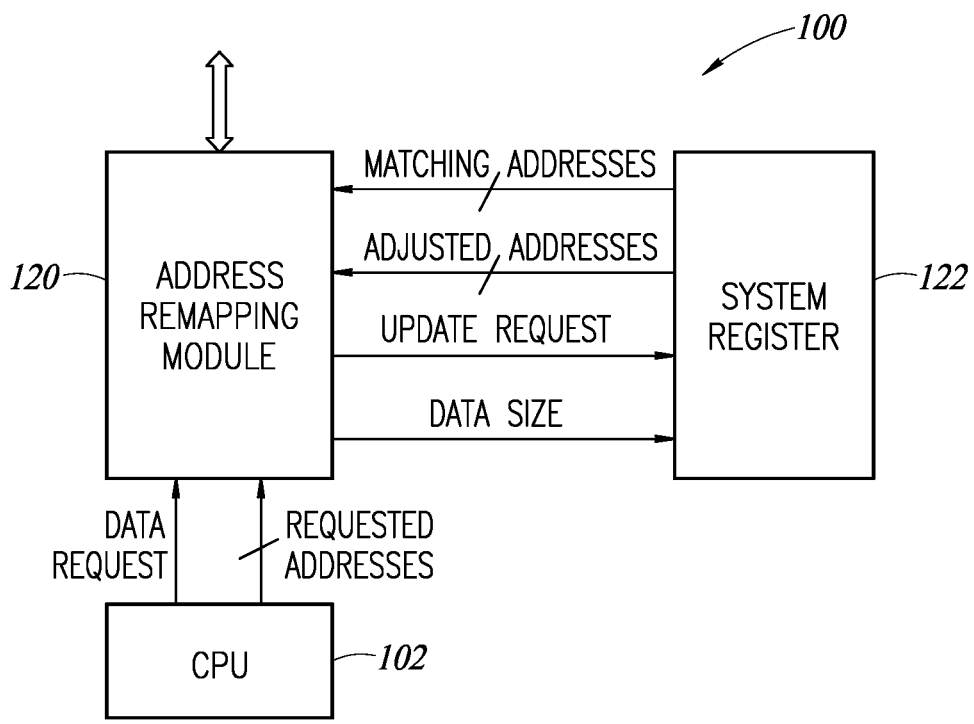
FIG. 2 is a block diagram of a portion of a system including an address remapping module, in accordance with one embodiment.

FIG. 2 illustrates a portion of the system 100 of FIG. 1, in accordance with one embodiment. FIG. 2 illustrates the data side of the CPU 102. The data side corresponds to the portion of CPU that outputs data and receives data. This is in contrast with the instruction side of the CPU (not shown) that may provide or receive software instructions or other types of instructions. The instruction side of the CPU 102 may be directly connected to the main bus 108, whereas the data side of the CPU 102 is connected to the main bus 108 via the address remapping module 120.

When the CPU 102 wishes to make a data request (a request to read data from a subsystem of the system 100 or a request to write data to a subsystem of the system 100), the data request is passed to the address remapping module 120. The CPU 102 also passes the set of requested addresses associated with the data request to the address remapping module. Though not shown in FIG. 2, the CPU 102 may also provide the data values that will be written to the various requested addresses. Furthermore, though not shown in FIG. 2, the address remapping module 120 may provide data values read from the various subsystems to the CPU 102 in response to the data request.

When the address remapping module 120 receives the data request and the requested addresses, the address remapping module 120 provides an update request to the system register 122. The update request may include a single bit that indicates that address comparisons are to be performed. Alternatively, the update request may include other types of data such as address ranges, a subsystem identification associated with the data request, or other types of information.

When the address remapping module 120 receives the data request and the requested addresses, the address remapping module 120 provides a data size to the system register 122. The data size can include a size of the data to be written or to be read. The size of the data can include a bit, a number of bits, a byte, a number of bytes, a word, a number of words, or other indications of a size of the data to be written to or read from a subsystem of the system 100.

When the system register 122 receives the update request and the data size, the system register 122 provides a set of matching addresses and a set of adjusted addresses to the address remapping module 120 in response to the update request. The set of matching addresses includes a list of memory addresses for which changes should be made. The adjusted addresses can include, for each address from the matching addresses, an adjusted address indicating the address to which the matching address should be changed.

After the address remapping module 120 receives the matching addresses and the adjusted addresses from the system register 122, the address remapping module 120 compares each of the requested addresses to the matching addresses. If a requested address matches one of the matching addresses, the address remapping module changes the requested address to the value of an adjusted address associated with the matching address. The address remapping module can perform this comparison for each of the requested addresses. For each requested address received from the CPU 102, the address remapping module 120 either forwards the requested address (if no change is to be made) or the corresponding adjusted address (if a change is to be made) for the main bus 108. If the data request corresponds to a data write operation, the address remapping module 120 may provide a data value to be written to each address. If the data request corresponds to a data read operation, then the address remapping module 120 may receive data values associated with the data addresses from the main bus 108 may provide the data values to the CPU 102.

Figure 3:
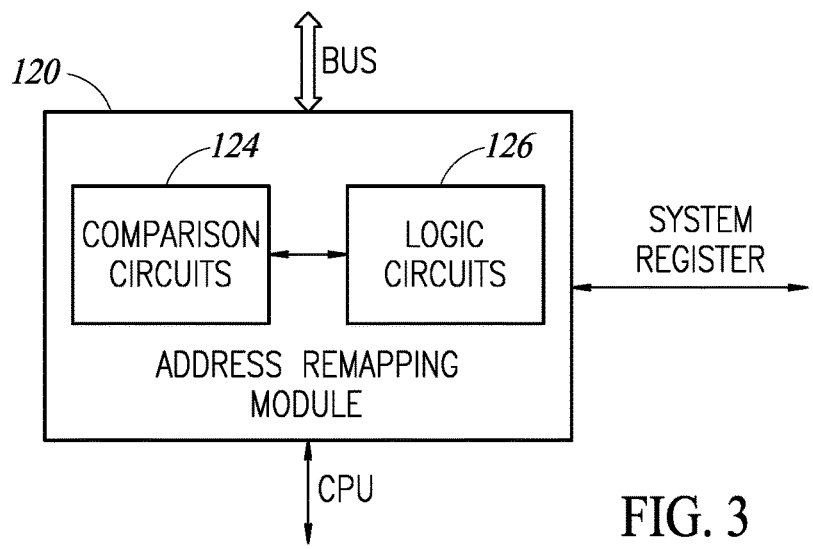
FIG. 3 is a block diagram of an address remapping module, in accordance with one embodiment.

FIG. 3 is a block diagram of an address remapping module 120, in accordance with one embodiment. The address remapping module 120 of FIG. 3 is one example of an address remapping module 120 of FIGS. 1 and 2. The address remapping module 120 includes comparison circuits 124 and logic circuits 126. The address remapping module 120 may also include memory.

The comparison circuits 124 can include a plurality of comparators that collectively receive the requested addresses from the CPU 102 and the matching addresses from the system register 122. The comparators can then compare the requested addresses to the matching addresses. If the requested address matches a matching address, then the logic circuits 126 can retrieve the associated adjusted address and the address remapping module 120 can provide the adjusted address to the main bus 108. If the requested addresses do not match a matching address, then the address remapping module 120 can pass the requested address unchanged to the main bus 108. The address remapping module 120 can include other circuits or components without departing from the scope of the present disclosure.

Figure 4:
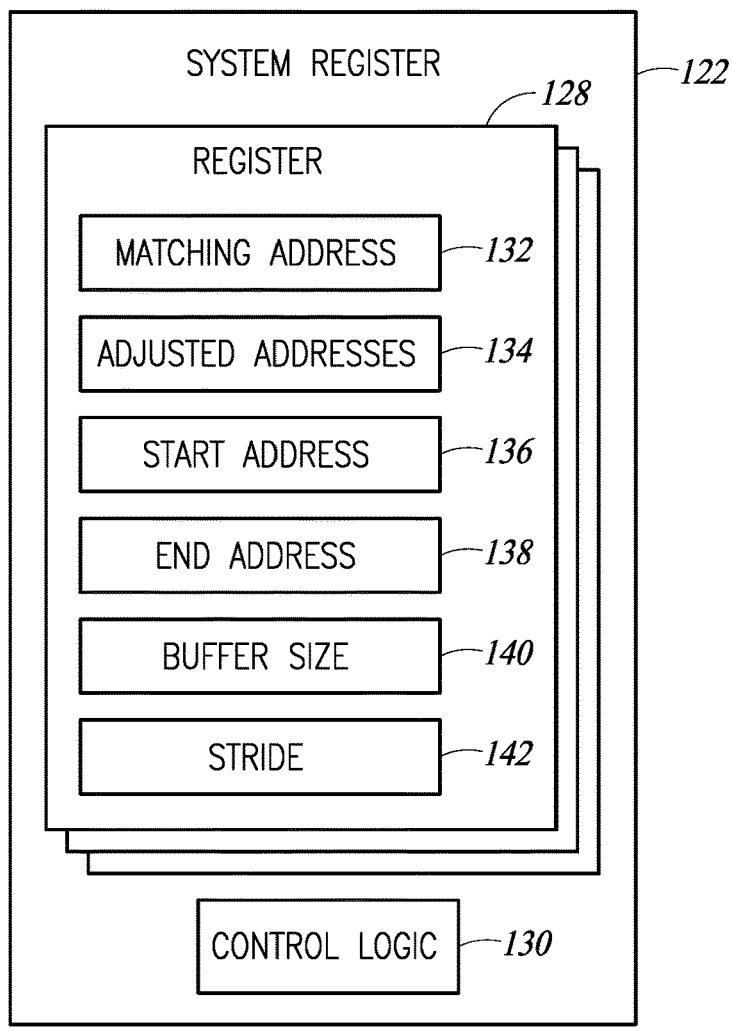
FIG. 4 is a block diagram of a system register, in accordance with one embodiment.

FIG. 4 is a block diagram of a system register 122, in accordance with one embodiment. The system register 122 may include a plurality of registers 128. Each register 128 may be associated with a different subsystem of the system 100. Each register 128 can store a set of matching addresses 132, a set of adjusted addresses 134, a start address 136, an end address 138, a buffer size 140, and a stride value 142. Each of these can be stored in a memory or sub-register.

The matching addresses 132 may correspond to the matching addresses provided to the address remapping module 120, as described previously. The adjusted addresses 134 may correspond to the adjusted addresses provided to the address remapping module 120, as described previously. The start address 136 may correspond to the beginning address for the set of addresses for which changes will be made. The end address 138 may correspond to the end address for which changes will be made. The buffer size 140 may correspond to a size of a buffer, such as a circular buffer that is implemented in conjunction with the register 128. The stride 142 may indicate a length of an address jump.

Each register 128 may be associated with a particular circular buffer or other type of buffer or memory implementation. For example, a buffer 128 may be configured and utilized for implementing an 8-tap FIR filter as described previously. Rather than implementing a costly software loop, the system register 122 and the address remapping module 120 can collectively implement the addressing associated with the FIR filter with substantially little or no delay and very little computation resources.

The system register 122 may also include control logic 130. The control logic 130 can help implement the functions of the system register 122. For example, the control logic 130 can enable an operator of the system 100 to write data to the registers 128 in order to implement one or more memory addressing schemes for the CPU 102 in conjunction with the address remapping module 120.

Figure 5:
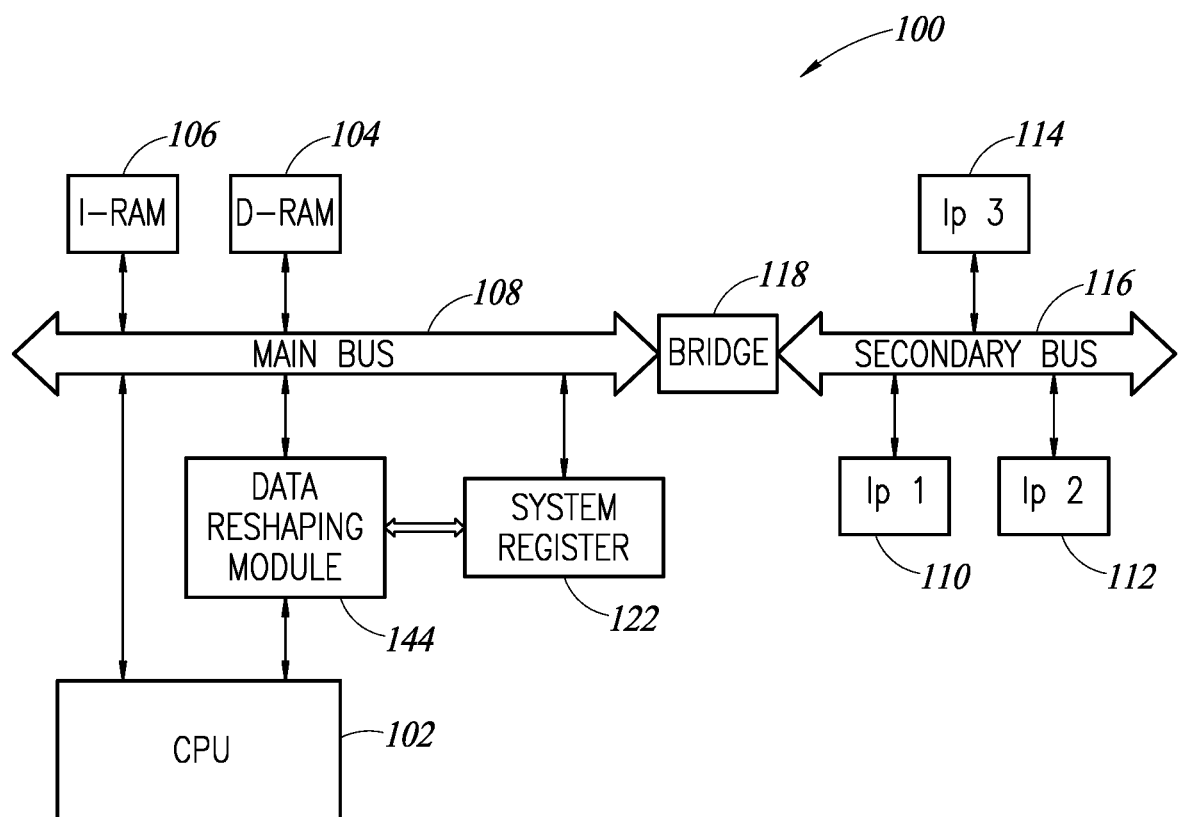
FIG. 5 is a block diagram of a system including a data reshaping module, in accordance with one embodiment.

FIG. 5 is a block diagram of a system 100, in accordance with one embodiment. The system 100 may correspond to a system on chip (SoC) or another type of system in an integrated circuit. The system 100 includes a CPU 102 a data reshaping module 144, and a plurality of subsystems. As will be set forth in more detail below, the data reshaping module 144 cooperates with the CPU 102 to provide effective and efficient data reshaping for read and write operations associated with the CPU 102.

The system 100 includes a DRAM 104, an IRAM 106, and a main bus 108. The system 100 further includes a secondary bus 116, a first subsystem (IP1) 110, a second subsystem (IP2) 112, and a third subsystem (IP3) 114, and a secondary bus 116 coupled to the first, second, and third subsystems 112, 114, and 116. The secondary bus 116 may be coupled to the main bus 108 by a bridge 118. The components of the system 100 of FIG. 5 may function substantially similarly to the components of the system 100 of FIG. 1.

When the CPU 102 reads data from one of the components of the system 100, the CPU 102 may make a data request. The data request may correspond to a request to read data from one of the components of the system 100. The data request may include one or more requested addresses. The requested addresses correspond to the memory addresses within a component or memory array from which the CPU 102 desires to obtain data values. The data request may also include a size of the data being requested (a bit, a byte, a word, etc.). The CPU 102 may provide the data request via the main bus 106 and may also receive the desired data via the main bus 106.

The data request may also correspond to a request to write data from or to provide data to one of the components of the system 100. In this case, the data request may also include requested addresses. The requested addresses indicate the addresses within a memory array or component which the CPU 102 wants to write data. The data request may also include the data values to be written to the various data addresses.

In some cases, is beneficial to change the data values associated with various memory addresses. For example, it may be beneficial to change the sign of a data value, to add a constant to a data value, to subtract a constant from a data value, to reassign a bit, byte, half-byte, or word to either binary 0 or 1, to compare a data value to a constant and to set the data value to 0 or 1 accordingly, to change the order of data values within a byte or half byte, or to make other types of transformations to data values.

One possible solution for changing or transforming data values is to simply calculate data transformations within the CPU. However, this can result in a large number of clock cycles to perform computations. Another possible solution is to utilize large tables of values and to swap data values with values from the tables. However, this results in increased memory usage.

To illustrate the drawbacks of these solutions, consider a real fast Fourier transform (FFT) algorithm. The algorithm may be based on the following computation:

$$X_k = \sum_{n=0}^{N-1} x_n e^{-i2\pi kn/N} \quad k = 0, \ldots, N-1,$$

where $x_0, x_1, \ldots x_{N-1}$ are complex numbers and $$e^{\frac{i2\pi}{N}}$$

is a primitive Nth root of 1. The real sequence is initially treated as if it were complex to perform a complex FFT. Later, a processing stage reshapes the data to obtain half of the frequency spectrum in complex format. Aside from the first complex number that contains the two real numbers X[0] and X[N/2], all the data is complex. In other words, the first complex sample contains two real values. The Fast RFFT algorithm relies on the mixed radix CFFT that save processor usage. The twiddle factors $$\left(e^{\frac{i2k\pi}{N}}\right),$$

in FFT algorithms, are the trigonometric constant coefficients that are multiplied by the data during the algorithm. In one solution, the twiddle values can be managed purely via computation within the CPU by simply calculating each twiddle factor during the FFT algorithm. Another possible solution is to have all of the twiddle factors pre-calculated and stored in memory. The first way leads to an increase of computations that in many case is not feasible due to a limited clock cycles for each algorithm. The second way, in many cases results in one or more huge tables to compute the FFT algorithm, which results in a higher memory space requirement. In the second solution, a 2048 points real FFT requires 512 complex twiddle factors for the 1024 points CFFT and another 512 complex twiddle factor for the last split stage. In the case of a single precision floating point, 2048 single precision constants results in 8 KB of additional memory space.

In one embodiment, the system 100 implements a solution that overcomes the drawbacks of other potential solutions. In particular, the system 100 utilizes a data reshaping module 144 and the system register 122 to efficiently and effectively transform data values associated with data requests from the CPU 102. In the example of a FFT process, the result is that a very small table of twiddle values can be stored in a table. The small number of data value stored in the table can be automatically transformed by the data reshaping module 144 to provide the large number of twiddle values utilized by the CPU. Thus, the CPU is not utilized to calculate all the twiddle values. Furthermore, all of the twiddle values do not need to be stored in memory. These principles extends to various other situations in which it is beneficial to transform data values from one data value to another.

The data reshaping module 144 corresponds to a hardware circuit implemented in the system 100 between the CPU 102 and the main bus 108. The system register 122 also corresponds to a hardware circuit coupled to the data reshaping module 144 and the main bus 108.

When the CPU 102 makes a data request to read data from or write data to a component of the system 100, the data request is provided to the data reshaping module 144. As set forth previously, the data request can include a size of the data and requested addresses corresponding to the memory addresses from which data is to be read or to which data is to be written. The address remapping module receives the requested addresses, compares the requested addresses to a set of addresses for which changes should be made, or to a range of addresses in accordance with a starting address and an ending address, and then changes the data values retrieved from those address in accordance with a data reshaping type. The data reshaping module 144 then provides the reshaped data values (or adjusted data values or transformed data values) to the CPU.

In one embodiment, the system register stores a set of start address and an end address. The system register also stores one or more data reshaping types indicating the type of transformation to be performed on the data values.

When the data request is received by the data reshaping module 144, the data reshaping module 144 may provide an update request to the system register 122. The update request indicates that the system register 122 that requested addresses have been or will be received from the CPU 102.

The system register 122 provides an address range including a start address and the end address to the data reshaping module 144. The system register 122 also provides the data value indicating the type of reshaping or transforming that will be performed on the data values by the data reshaping module 144.

After receiving the data range, the data reshaping module 144 compares each of the requested addresses from the CPU 102 to the data range received from the system register 122. If a requested address falls within the data range, then the data reshaping module 144 transforms the data value associated with that address in accordance with the reshaped type received from the system register 122. For example, when the data request is made by the CPU 102, the data reshaping module 144 may pass on the addresses to the bus and the corresponding data values may be retrieved. Upon retrieval, the data reshaping module 144 reshaped the data values before providing them to the CPU 102. Additionally, if data is to be written to memory from the CPU 102, the data reshaping module 144 reshapes the data values corresponding to addresses that fall within the range provided by the system register 122 and then provides the transformed or adjusted data values to the main bus 108.

The data reshaping module 144, in conjunction with the system register 122, can catch all valid addresses and in the case of matching addresses, can reshape the data values associated with those addresses. The data reshaping module 144 can quickly and efficiently reshape any data values that need to be changed. This overcomes the drawbacks of implementing software instructions that may utilize many processing cycles and computing resources to calculate data values in the CPU 102. Furthermore, this overcomes the drawbacks of storing large numbers of data values in memory.

Additionally, the data reshaping module 144 of the system register 122 do not consume large amounts of area. In one embodiment, the data reshaping module 144 can include a relatively small amount of comparison circuits, data reshaping circuits, and logic circuits, taking up a very small amount of area in the SoC or other chip architecture. Additionally, the system register 122 may simply include various registers or buffers for storing list of addresses, buffer sizes, strides, start addresses, and addresses. Both the data reshaping module 144 and the system register 122 are inexpensive in terms of area and computation time.

Figure 6:
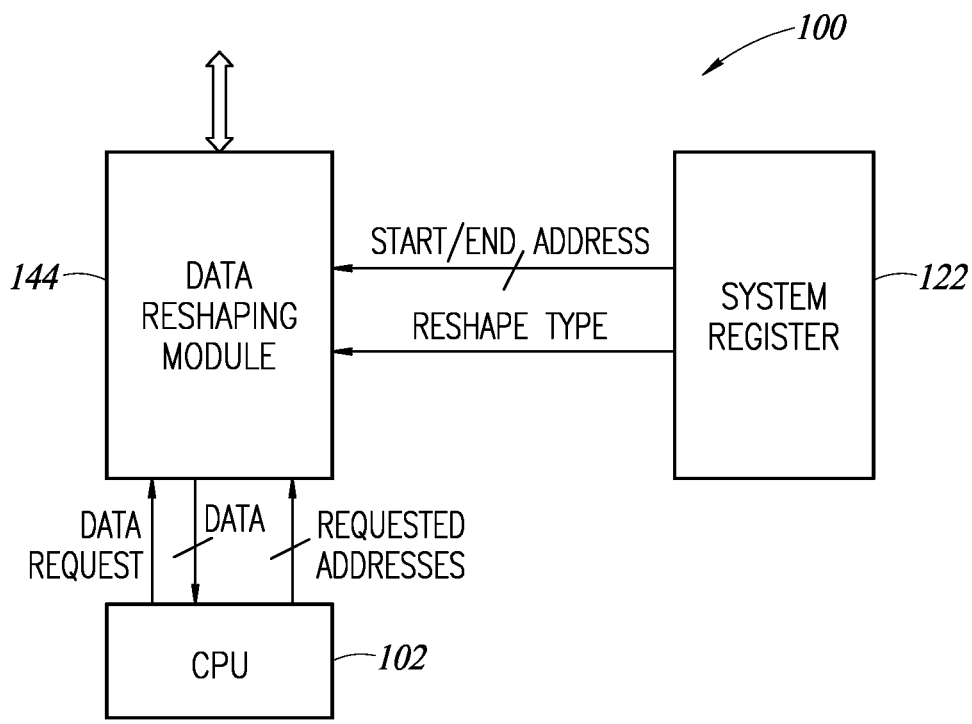
FIG. 6 is a block diagram of a portion of a system including a data reshaping module, in accordance with one embodiment.

FIG. 6 illustrates a portion of the system 100 of FIG. 5, in accordance with one embodiment. When the CPU 102 wishes to make a data request (a request to read data from a subsystem of the system 100 or a request to write data to a subsystem of the system 100), the data request is passed to the data reshaping module 144. The CPU 102 also passes the set of requested addresses associated with the data request to the data reshaping module. The data reshaping module 144 may provide reshaped or transformed data values read from the various subsystems to the CPU 102 in response to the data request.

When the data reshaping module 144 receives the data request and requested addresses, the data reshaping module 144 provides an update request to the system register 122. The update request may include a single bit that indicates that address comparisons are to be performed. Alternatively, the update request may include other types of data such as address ranges, a subsystem identification associated with the data request, or other types of information.

When the system register 122 receives the update request, the system register 122 provides a range of addresses and a reshape type to the data reshaping module 144 in response to the update request. The data range can include a start address and an end address corresponding to the range of addresses for which a reshaping operation should be performed. The reshape type indicates what type of reshaping should be performed. For example, the reshape type could include changing the sign of data values (i.e., between positive and negative), adding a constant, subtracting a constant, setting a bit, byte, or other type of data value to 0 or 1, comparing a data value to a constant and setting to 0 or 1 based on the comparison, changing the order of bits in a data value, or other types of transformations.

After the data reshaping module 144 receives the data range and the reshape type from the system register 122, the data reshaping module 144 compares each of the requested addresses to the data range. If a requested address falls within the data range, the address remapping module changes the data value associated with the requested address in accordance with the reshape type. The data reshaping module 144 can perform this comparison for each of the requested addresses and reshapes data coming from the CPU 102 or going to the CPU 102 in accordance with the comparison.

In one embodiment, the data reshaping can include reshaping twiddle values for an FFT process. For example, a small table of twiddle values can be stored in memory. A twiddle value read from the memory can then be transformed to have a negative value, or in some other way. The result is that a small number of twiddle values can be stored and the data transformations can be utilized to provide a larger number of twiddle values based on the smaller number of stored twiddle values. Further details regarding FFTs and twiddle value transformations are provided below.

In one embodiment, the data reshaping can supplement an "accumulate if positive" function. If such a function is implemented via software, five cycles or more may be utilized for each data value that may be accumulated in a total. However, with the data reshaping module 144, the accumulate if positive function is quicker and less expensive. For example, the data reshaping module can transform any negative data value to a value of 0. All values can then be accumulated by the CPU. The CPU does not need to perform any checks and only a single cycle is utilized for each data value because all negative data values have been transformed or reshaped to 0.

In one embodiment, the order of data values in a word of data can be rearranged. If such a rearrangement is performed by the CPU 102, 11 or more cycles may be utilized. However, if the rearrangement is performed by the data reshaping module, then the byte positions within a word can be rearranged in a single cycle with substantially no loss of time or computation resources.

Figure 7:
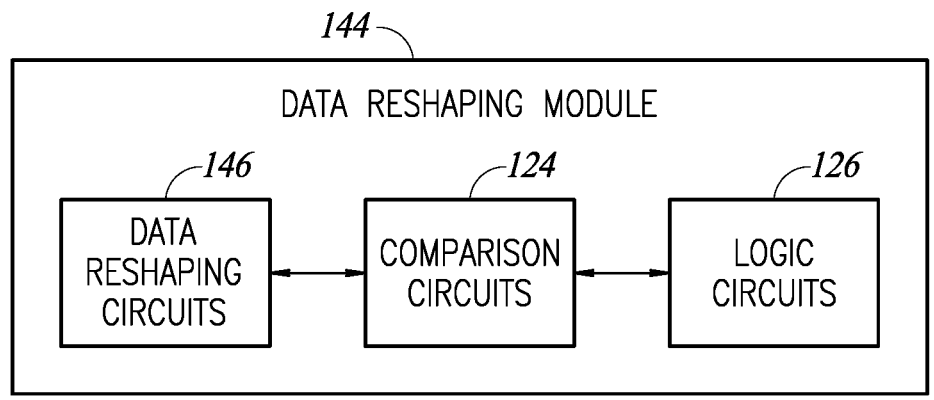
FIG. 7 is a block diagram of a data reshaping module, in accordance with one embodiment.

FIG. 7 is a block diagram of a data reshaping module 144, in accordance with one embodiment. The data reshaping module 144 of FIG. 7 is one example of a data reshaping module 144 of FIGS. 5 and 6. The data reshaping module 144 includes comparison circuits 124, data reshaping circuits 146, and logic circuits 126. The data reshaping module 144 may also include other components without departing from the scope of the present disclosure.

The comparison circuits 124 can include a plurality of comparators that collectively receive the requested addresses from the CPU 102 and the address range from the system register 122. The comparators can then compare the requested addresses to the address range. If the requested addresses fall within the address range, then the data reshaping circuits 146 can reshape the data values in accordance with the specified reshape type. The data reshaping circuits can also include comparators, logic gates, and other types of circuits for performing transformations or reshaping of data. If the requested addresses fall within the range of data values, then the data reshaping module 144 can pass the data values to the CPU 102 or to the main bus 108, as the case may be.

Figure 8:
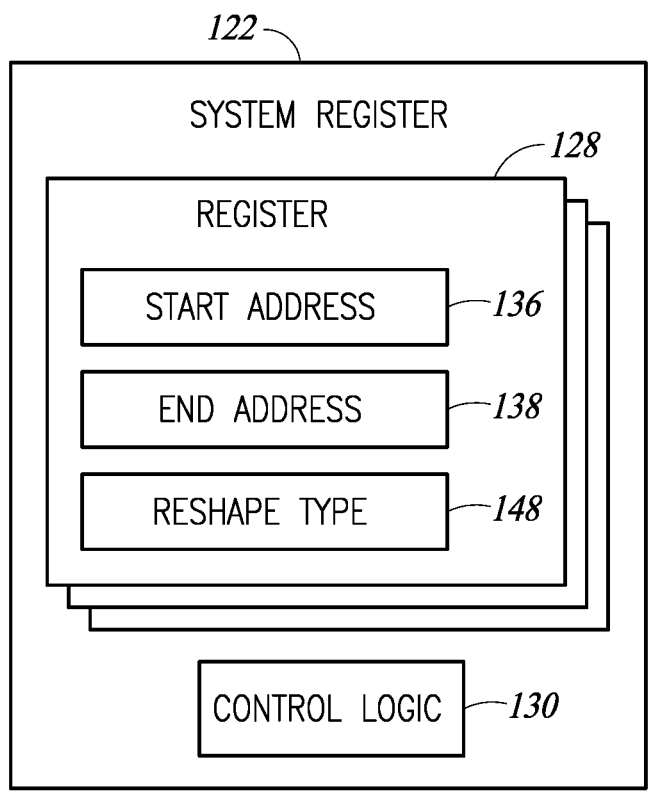
FIG. 8 is a block diagram of a system register, in accordance with one embodiment.

FIG. 8 is a block diagram of a system register 122, in accordance with one embodiment. The system register 122 may include a plurality of registers 128. Each register 128 may be associated with a different subsystem of the system 100 or with a different operation. Each register 128 can store a start address 136, an end address 138, and a reshape type 148. Each of these can be stored in a memory or sub-register.

The start address 136 may correspond to the beginning address for the set of addresses for which changes will be made. The end address 138 may correspond to the end address for which changes will be made. The reshape type 148 can indicate a type of transformation, adjustment, or reshaping to be performed by the data reshaping module 144.

The system register 122 may also include control logic 130. The control logic 130 can help implement the functions of the system register 122. For example, the control logic 130 can enable an operator of the system 100 to write data to the registers 128 in order to implement one or more memory addressing schemes for the CPU in conjunction with the data reshaping module 144.

Figure 9:
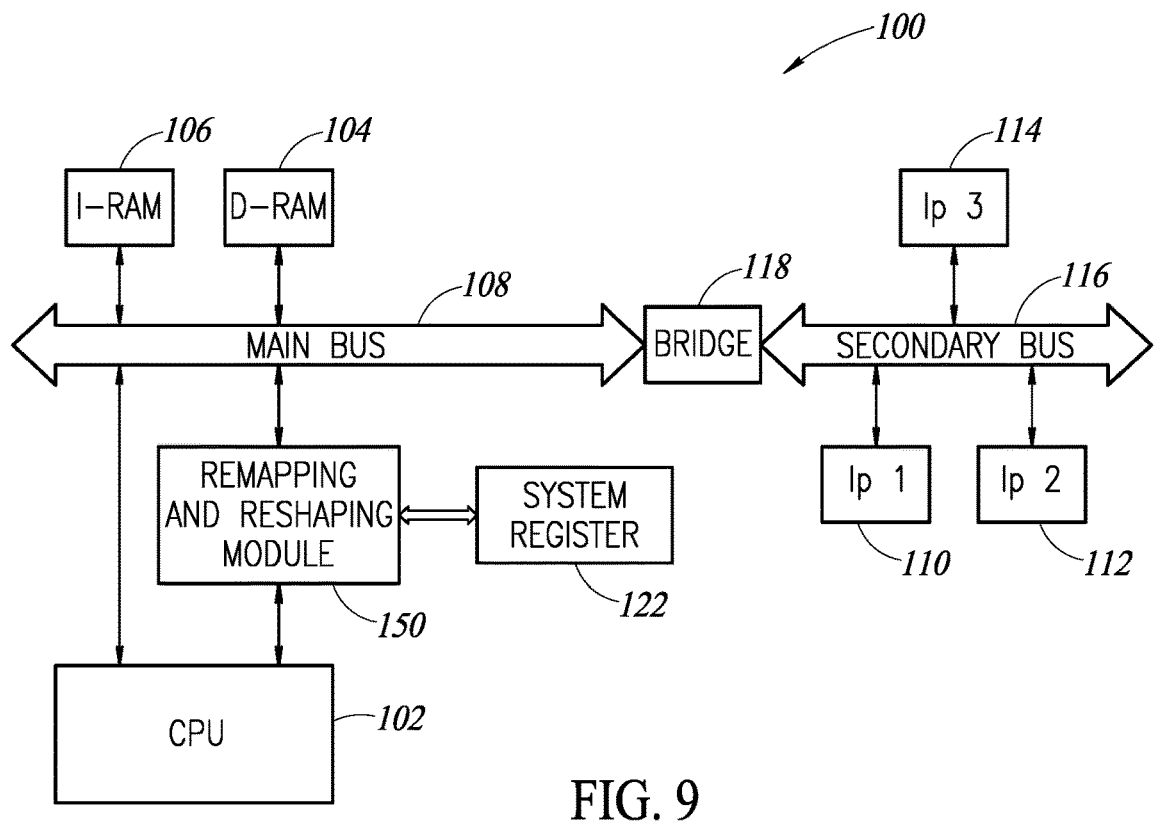
FIG. 9 is a block diagram of a system including a remapping and reshaping module, in accordance with one embodiment.

FIG. 9 is a block diagram of a system 100, in accordance with one embodiment. The system 100 can be implemented in an SoC or another type of integrated circuit system. The components of the system 100 of FIG. 9 are substantially the same as described in relation to FIGS. 1 and 5. However, the system 100 of FIG. 9 includes a remapping and reshaping module 150. The remapping and reshaping module 150 performs the address remapping functions of the address remapping module 120 described in relation to FIGS. 1-4. The remapping and reshaping module 150 also performs the data reshaping functions of the data reshaping module 144 described in relation to FIGS. 5-8. Accordingly, the remapping and reshaping module 150, as well as the system register 122, can include all of the components and perform all the functions described in relation to the address remapping module 120, the data reshaping module 144, and the system register 122 described in relation to FIGS. 1-9.

The remapping and reshaping module 150 can receive a data request from the CPU 102. The remapping and reshaping module 150 can provide an update request to the system register 122, as well as a data size. The system register 122 can provide matching addresses, adjusted addresses, a data range, and a reshape type to the remapping and reshaping module 150. For a given set of requested addresses, the remapping and reshaping module 150 can both provide adjusted addresses and can reshape data values as described previously.

Figure 10:
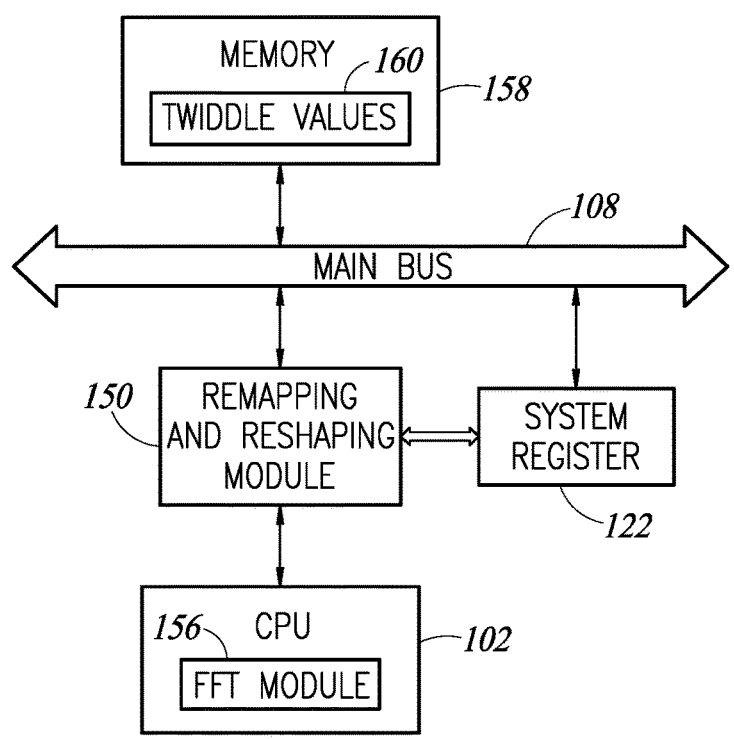
FIG. 10 is a block diagram of a system including a remapping and reshaping module utilized for fast Fourier transforms (FFT), in accordance with one embodiment.

FIG. 10 is a block diagram of a portion of a system 100, in accordance with one embodiment. The block diagram of FIG. 10 is one example of a system 100 of FIG. 9. In particular, the system includes a remapping and reshaping module 150. Additionally, a memory 158 includes a table of twiddle values 160. The table of twiddle values 160 can correspond to a table of a relatively small number of twiddle values. The CPU 102 includes an FFT module that implements and FFT process 156 and is configured to perform FFT processes on data values received from one or more subsystems of the system 100. As will be set forth in more detail below, the remapping and reshaping module 150 can utilize address remapping and data reshaping to retrieve and transform the small number of twiddle values 160 to effectively and efficiently provide the full range of twiddle values utilized by the FFT module.

Figure 11A:
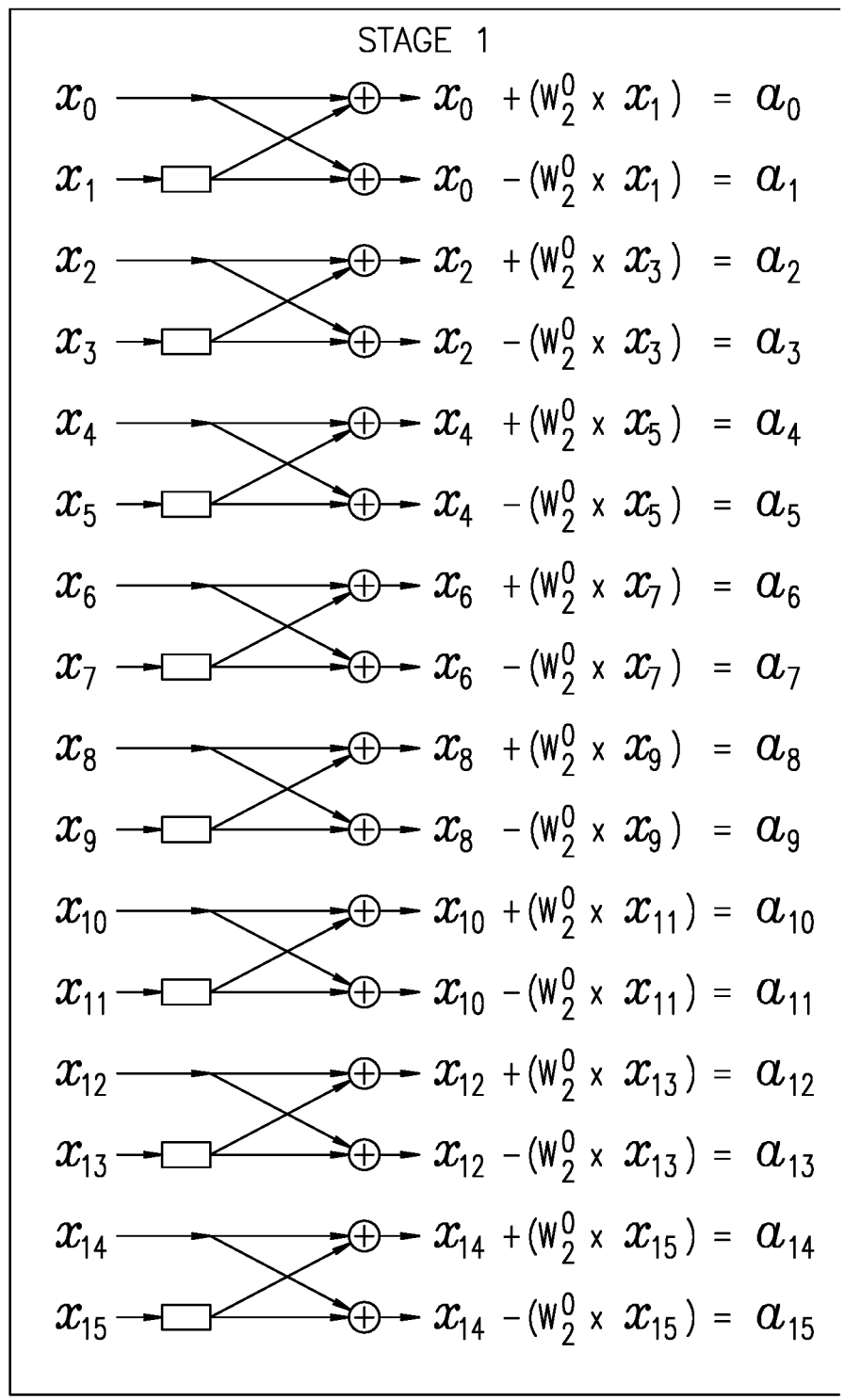
Figure 11C:
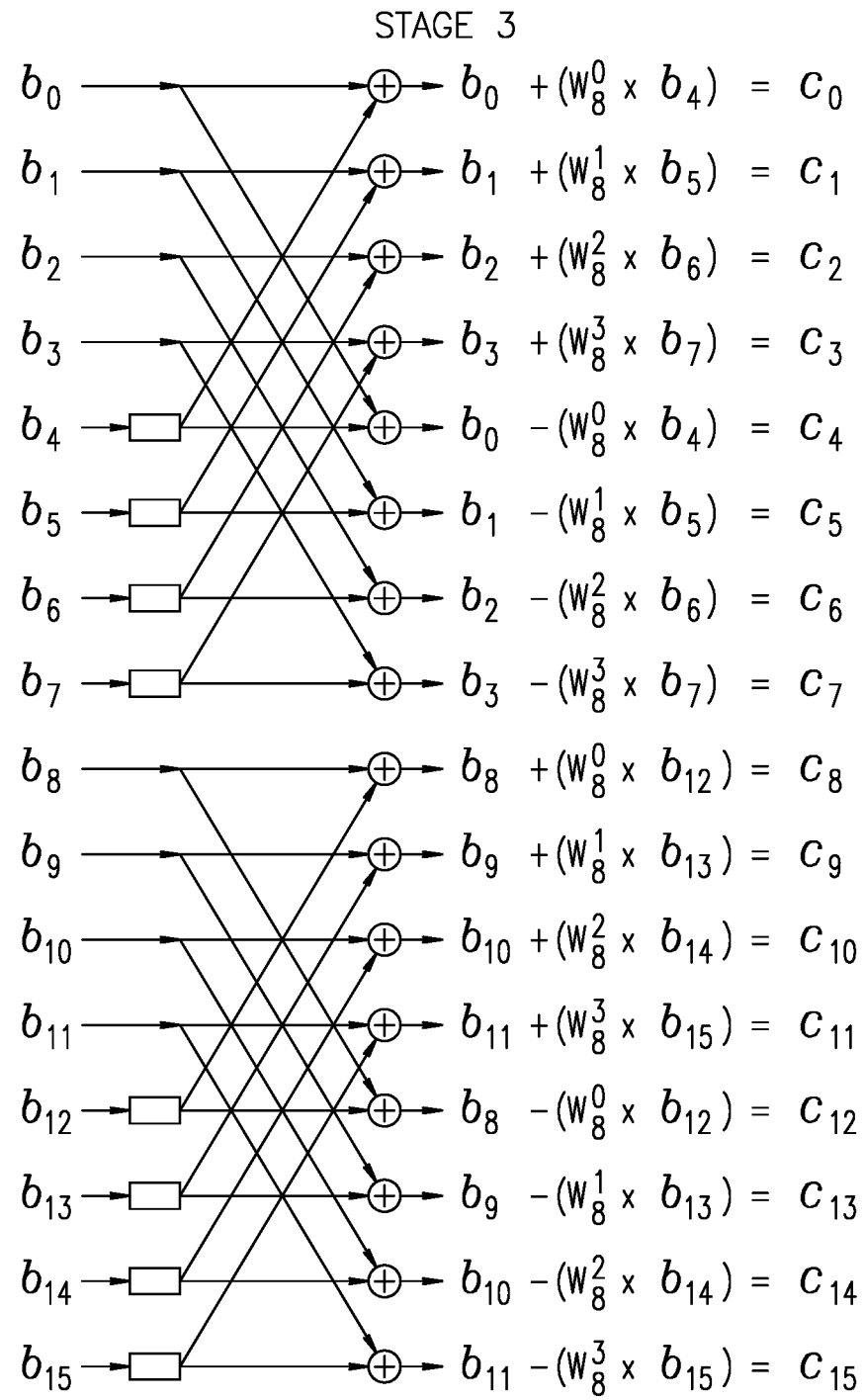
Figure 11D:
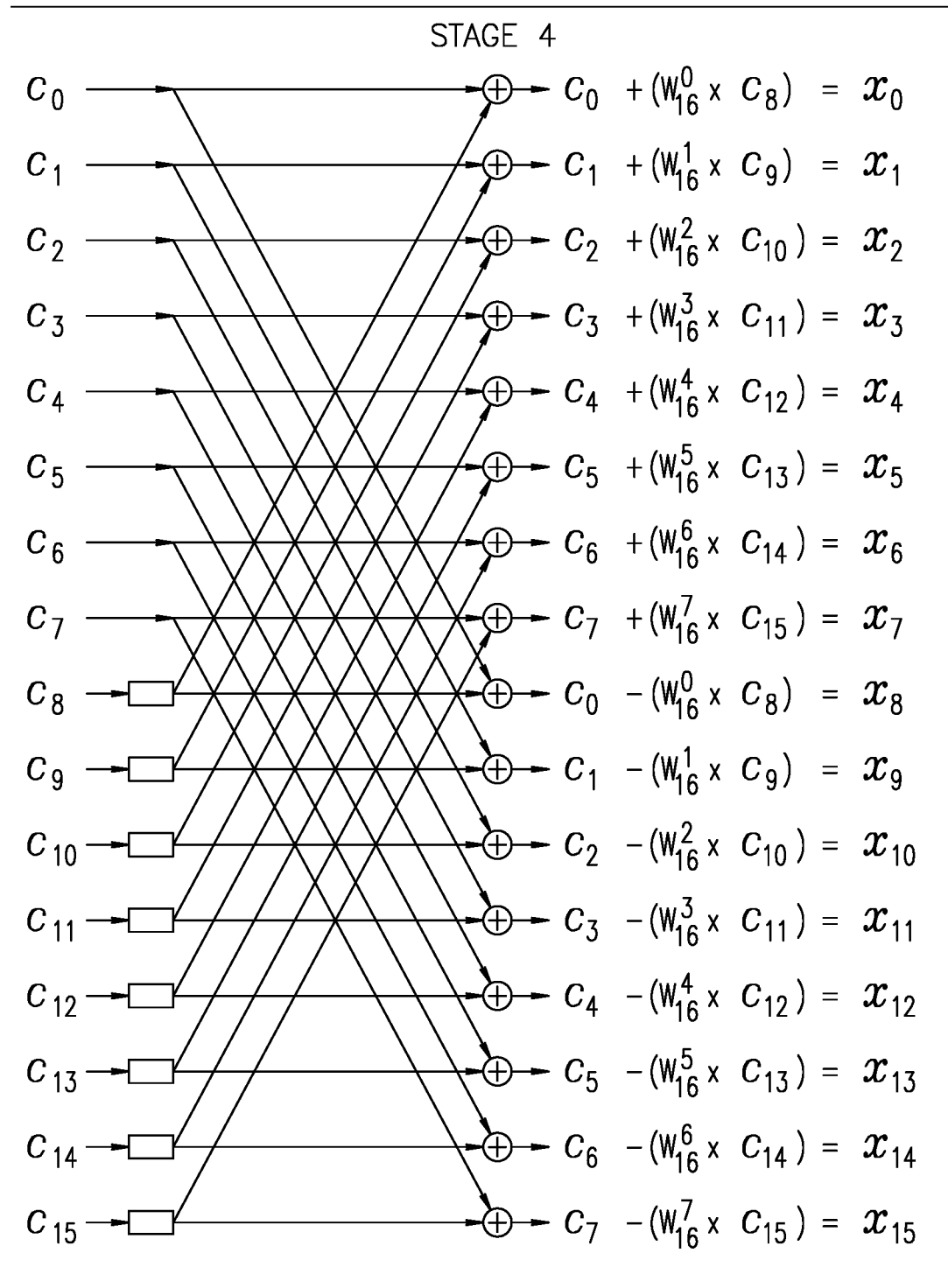

FIGS. 11A-11D illustrate respective stages of an FFT process performed by a CPU 102, in accordance with one embodiment. FIG. 11A illustrates a first stage of the FFT process. FIG. 11B illustrates a second stage of the FFT process. FIG. 11C illustrates a third stage of the FFT process. FIG. 11D illustrates a fourth stage of the FFT process. The FFT process receives sample data xn and outputs FFT data Xn. In the example of FIGS. 11A-11D, Stage 1 receives 16 sample values x0-x16. Each of the stages processes the sample values and outputs, at stage 4, FFT values X0-X15. In one example, the sample values may be time domain values, while the FFT values are frequency domain values. The FFT process utilizes twiddle values W to generate the FFT values.

The first stage receives the sample values $x_n$ and generates first intermediate values $a_n$ by multiplying the sample values by a twiddle value W. The second stage (see FIG. 11B) receives the first intermediate values an and generates second intermediate values bn by adding or subtracting one of the first intermediate values from the product of another first intermediate value and one of two different twiddle values. The third stage (See FIG. 11C) receives the second intermediate values $b_n$ and generates third intermediate values $c_n$ by adding or subtracting one of the second intermediate values from the product of another first intermediate value and one of four different twiddle values. The fourth stage (See FIG. 11D) receives the third intermediate values $c_n$ and generates fourth intermediate values $d_n$ by adding or subtracting one of the second intermediate values from the product of another third intermediate value and one of eight different twiddle values. In one embodiment, the FFT process may include utilizing a split stage in which 16 twiddle values are utilized to generate the final FFT values.

Figure 12:
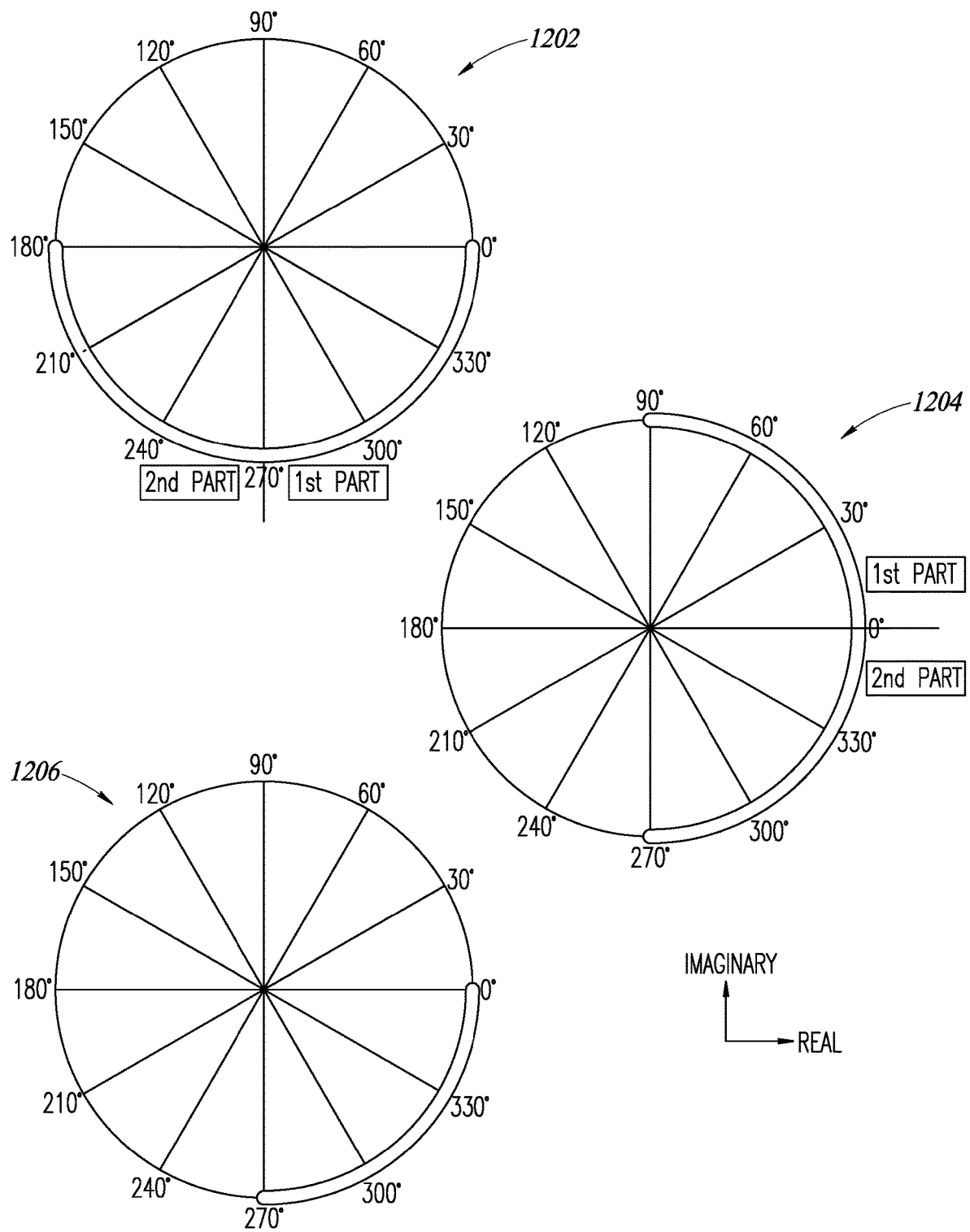
FIG. 12 includes unit circles representing complex twiddle values for an FFT process, in accordance with one embodiment.

FIG. 12 illustrates three unit circles that illustrate principles, based on which, the remapping and reshaping module 150 can generate a large number of twiddle values from a table of a small number of twiddle values stored in memory 158. For the unit circles illustrated in FIG. 12, the Y-axis (sine value) corresponds to the imaginary component of complex twiddle values. The X-axis (cosine value) corresponds to the real components of complex twiddle values. The unit circle 1202 illustrates that in a first part, twiddle values may be taken from the quadrant of the unit circle corresponding to between zero and 270°, while the second part twiddle values may be taken from a quadrant of the unit circle corresponding to between 180 and 270°. The unit circle 1204 illustrates that in a first part the twiddle values may be taken from the quadrant between zero and 90° and in a second part, the twiddle values can be taken from the quadrant between zero and 270°.

The unit circle 1206 of FIG. 12 illustrates that all the twiddle values for the unit circles 1202 and 1204 can be generated by starting with a small number of values in the quadrant between 0° and 270°. In particular, the real or imaginary component on any part of unit circle can be obtained as either one of the values in the quadrant between 0° and 270° or by flipping the sign of one of the values in the quadrant between 0° and 270°. Utilizing this principle, a table of a small number of twiddle values can be utilized to generate a large number of twiddle values by utilizing address remapping and data reshaping (changing the sign).

Figure 13:
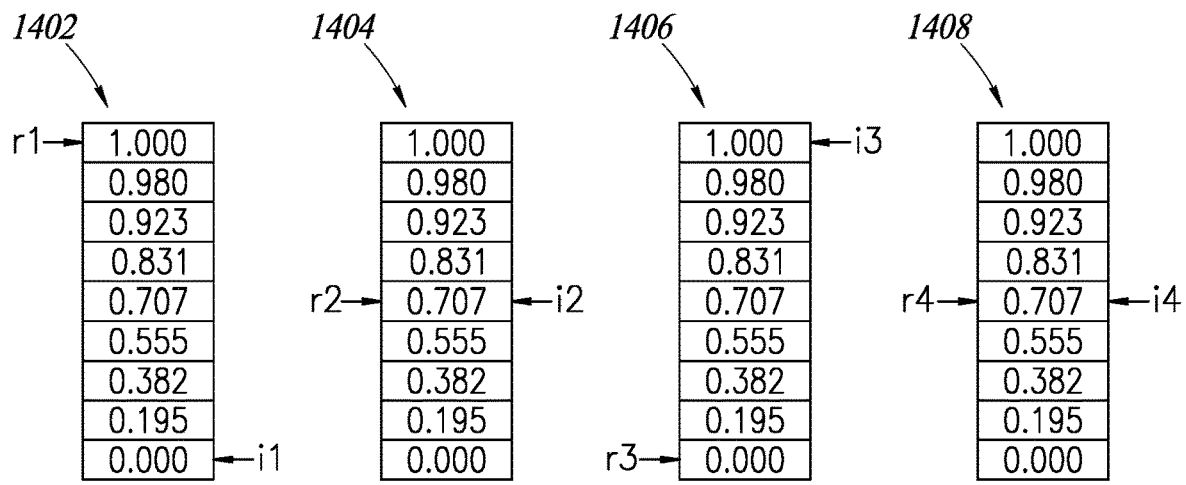
FIG. 13 is a table of twiddle values, in accordance with one embodiment.

FIGS. 13-16 illustrate a process of generating up to 16 twiddle values including real and complex components based on a table of nine twiddle values 160 in accordance with one embodiment. FIG. 13 illustrates a table of nine twiddle values 160. Each twiddle value has a memory address (not shown) associated with its place in the table.

Figure 14:
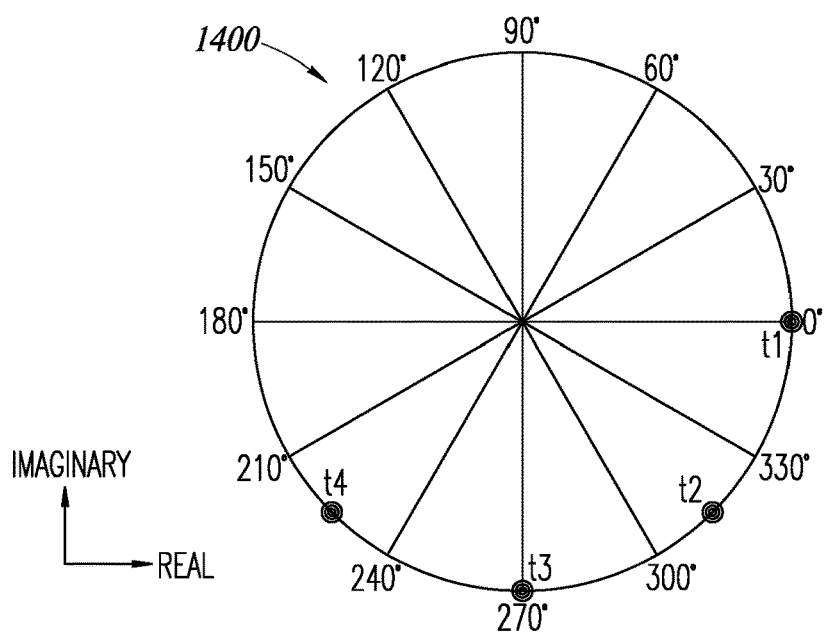
FIG. 14 includes a graph and tables associated with twiddle values for a stage of a FFT process, in accordance with one embodiment.

FIG. 14 illustrates a sequence for generating for twiddle values for the third stage of an FFT process, in accordance with one embodiment. FIG. 14 illustrates a unit circle 1400 utilized to find four twiddle values t1-8. Each twiddle value $t_n$ has a real component $r_n$ and a complex (imaginary) component in. For stage 3, the system register may set a stride value of four. For the first twiddle value t1, the real component t1 is at the top of the table and the imaginary component is at the bottom of the table. With a stride of 4, the second twiddle value t2 is obtained by moving four down (four address slots down) for the real component and four up (four address slots up) for the imaginary component. Furthermore, the imaginary component will have a negative value. Accordingly, the sign of the data value in the middle slot is changed from positive to negative for the imaginary component of t2. In fact, in stage 3 the sign of each of the imaginary components of the twiddle values are changed from positive to negative. The sign of the real component of the twiddle value t4 is changed from positive to negative. This is accomplished by the remapping and reshaping module 150 that strides the addresses and switches the signs of data values. In this manner, the twiddle values T3 and T4 are also obtained. The graphs 1402, 1404, 1406, and 1408 illustrate the values retrieved from the table for the various twiddle values t1-t4.

Figure 15:
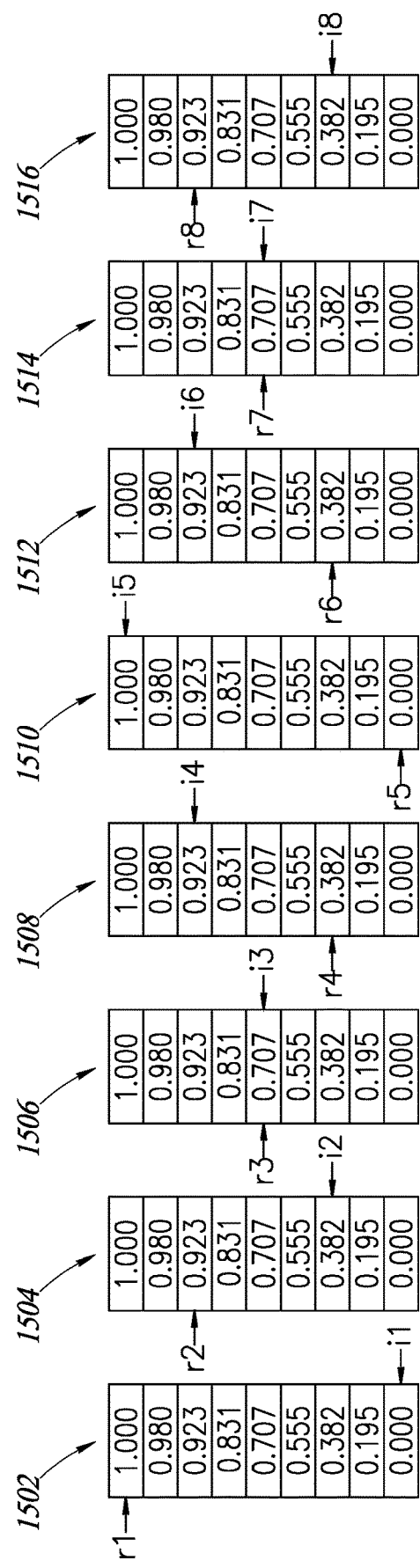
FIG. 15 includes a graph and tables associated with twiddle values for a stage of a FFT process, in accordance with one embodiment.
Figure 15:
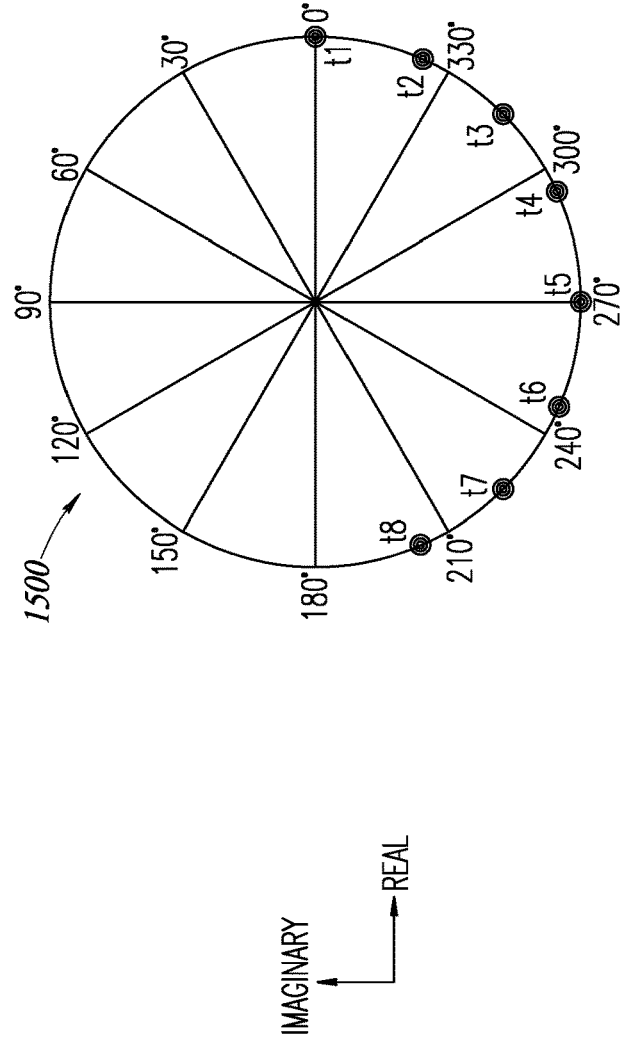

FIG. 15 illustrates a sequence for generating eight twiddle values for the fourth stage of an FFT process, in accordance with one embodiment. FIG. 15 illustrates a unit circle 1500 utilized to find 8 twiddle values t1-t8. Each twiddle value $t_n$ has a real component $r_n$ and a complex (imaginary) component i1. For stage 4, the system register may set a stride value of two. The tables 1502, 1504, 1506, 1508, 1510, 1512, 1514, and 1516 illustrate the table locations from which real and imaginary components are taken for the eight twiddle values utilized in stage four of the FFT process. Once again, the sign for each of the imaginary components of the twiddle values are flipped to negative from the value stored in the table. The sign for real components of the twiddle values t6-t8 have been flipped. The address striding and the sign changing for obtaining the twiddle values are performed by the remapping and reshaping module 150.

Figure 16A:
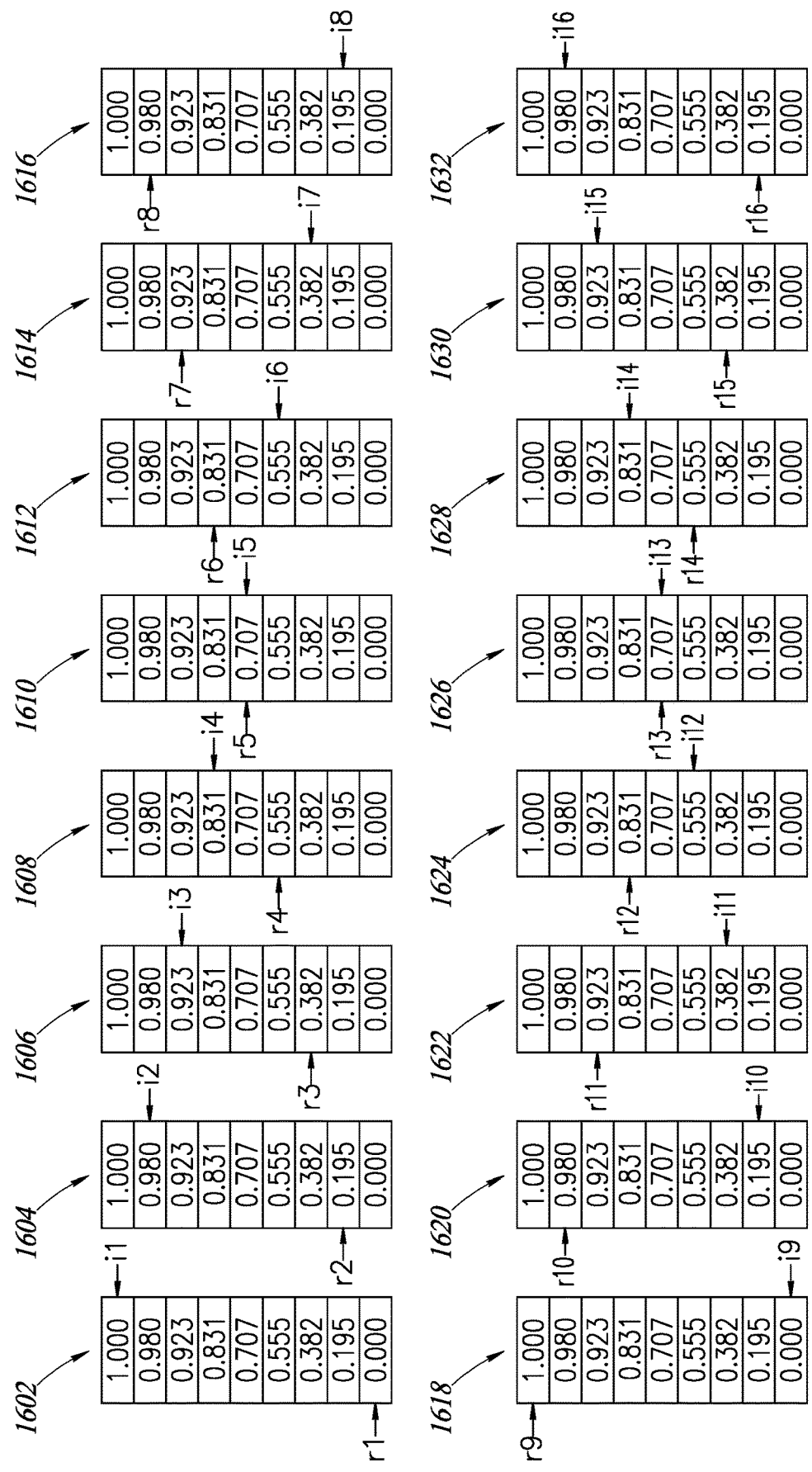
FIGS. 16A and 16B includes a graph and tables associated with twiddle values for a stage of a FFT process, in accordance with one embodiment.
Figure 16B:
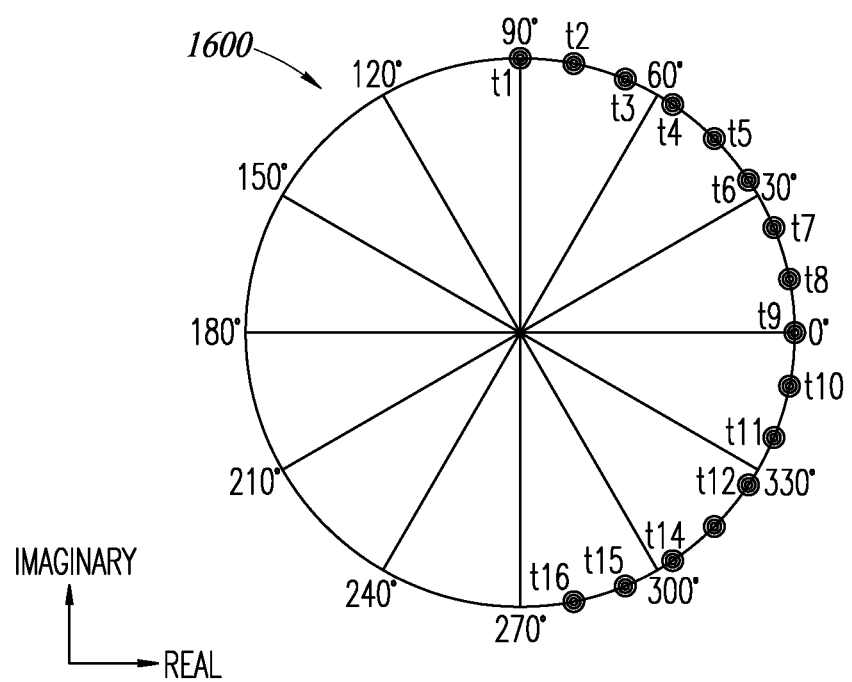

FIG. 16 illustrates a sequence for generating 16 twiddle values for the split stage of an FFT process, in accordance with one embodiment. FIG. 16B illustrates a unit circle 1600 utilized to find 16 twiddle values t1-t16. Each twiddle value t has a real component In and a complex (imaginary) component i1. For the split stage, the system register may set a stride value of one. The tables 1602, 1604, 1606, 1608, 1610, 1612, 1614, 1616, 1618, 1620, 1622, 1624, 1626, 1628, and 1630 illustrate the table locations from which real and imaginary components are taken for the 16 twiddle values utilized in the split stage of the FFT process. The sign for each of the imaginary components of the twiddle values t9-t16 are flipped to negative from the value stored in the table. The address striding and the sign changing for obtaining the twiddle values are performed by the remapping and reshaping module 150.

The process for providing twiddle values described in relation to FIGS. 10-16B is highly efficient compared to other solutions. The table of twiddle values can store N/4+1 real twiddle factors for an N-points complex FFT. The table of twiddle values can store N/2+1 real twiddle factors for an N-point real FFT.

Figure 17:
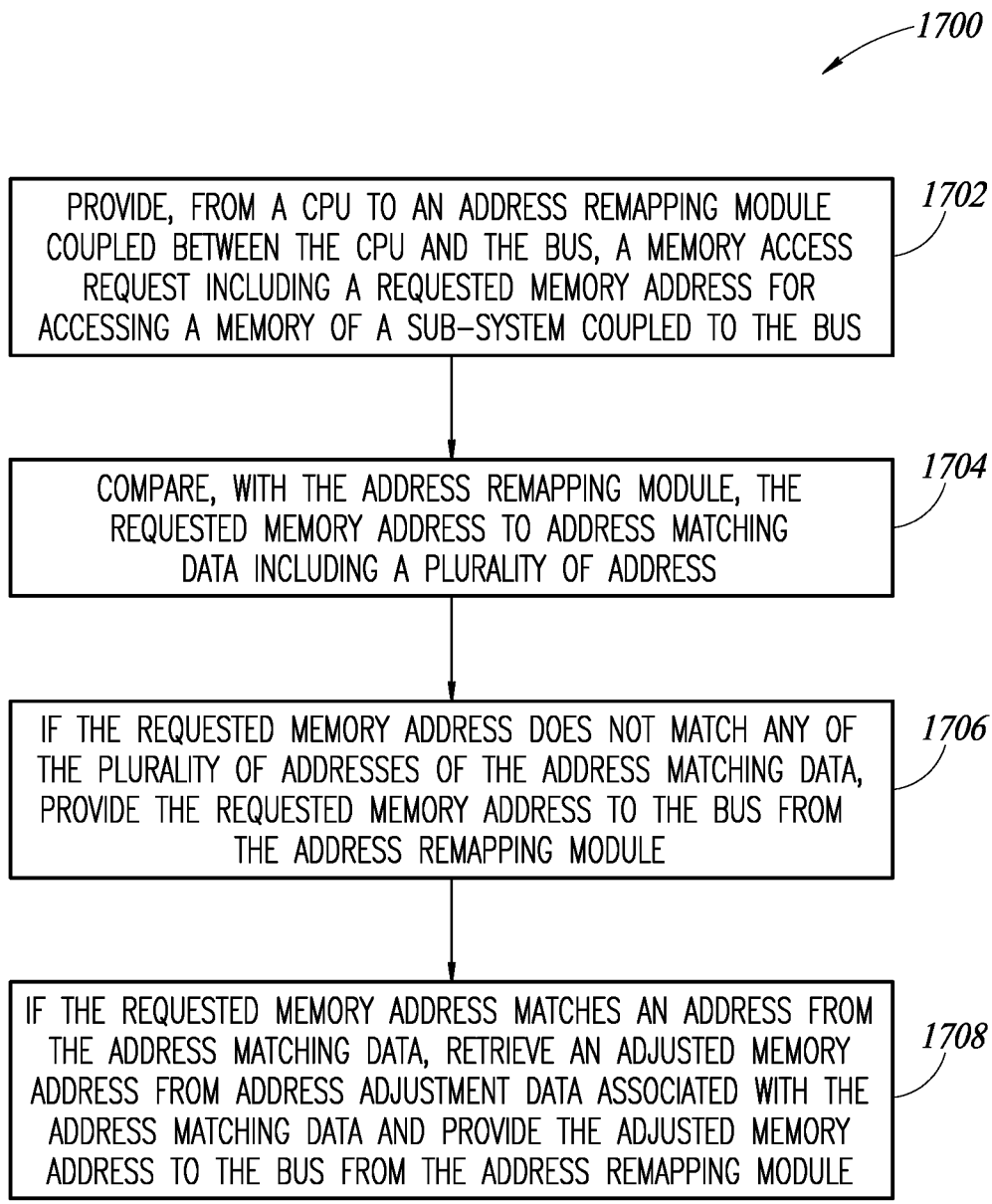
FIG. 17 is a flow diagram of a method, in accordance with one embodiment.

FIG. 17 is a flow diagram of a method 1700, in accordance with one embodiment. The method 1700 can utilize processes, systems, and components described in relation to FIGS. 1-16B. At 1702, the method 1700 includes providing, from a CPU to an address remapping module coupled between the CPU and the bus, a memory access request including a requested memory address for accessing a memory of a sub-system coupled to the bus. At 1704, the method of 1700 includes comparing, with the address remapping module, the requested memory address to address matching data including a plurality of addresses. At 1706, the method 1700 includes if the requested memory address does not match any of the plurality of addresses of the address matching data, providing the requested memory address to the bus from the address remapping module. At 1708, the method 1700 includes if the requested memory address matches an address from the address matching data, retrieving an adjusted memory address from address adjustment data associated with the address matching data and providing the adjusted memory address to the bus from the address remapping module.

Figure 18:
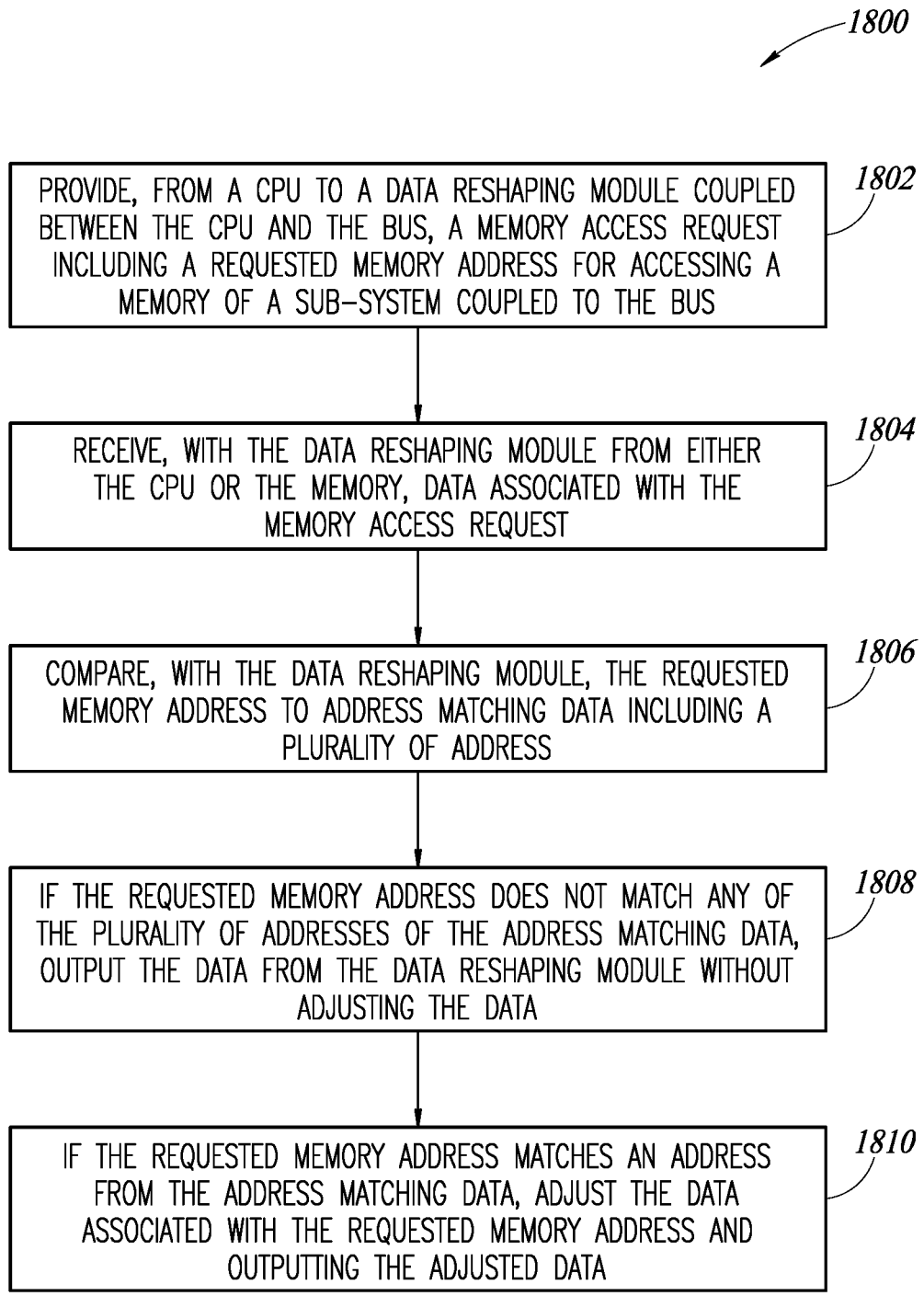
FIG. 18 is a flow diagram of a method, in accordance with one embodiment.

FIG. 18 is a flow diagram of a method 1800, in accordance with one embodiment. The method 1800 can utilize processes, systems, and components described in relation to FIGS. 1-16B. At 1802, the method 1800 includes providing, from a CPU to a data reshaping module coupled between the CPU and the bus, a memory access request including a requested memory address for accessing a memory of a sub-system coupled to the bus. At 1804, the method 1800 includes receiving, with the data reshaping module from either the CPU or the memory, data associated with the memory access request. At 1806, the method 1800 includes comparing, with the data reshaping module, the requested memory address to address matching data including a plurality of addresses. At 1808, the method 1800 includes if the requested memory address does not match any of the plurality of addresses of the address matching data, outputting the data from the data reshaping module without adjusting the data. At 1810, the method 1800 includes if the requested memory address matches an address from the address matching data, adjusting the data associated with the requested memory address and outputting the adjusted data.

Figure 19:
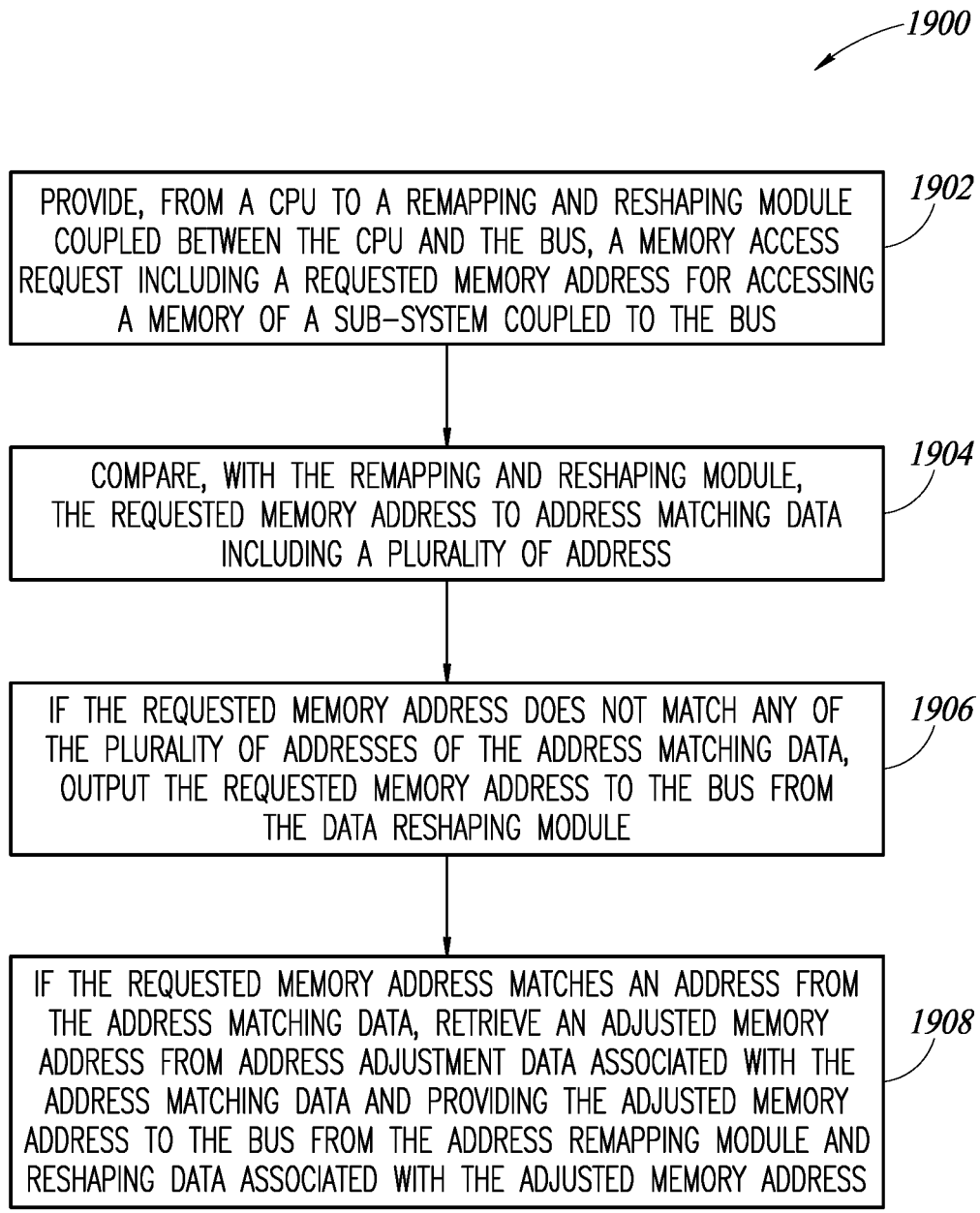
FIG. 19 is a flow diagram of a method, in accordance with one embodiment.

FIG. 19 is a flow diagram of a method 1900, in accordance with one embodiment. The method 1900 can utilize processes, systems, and components described in relation to FIGS. 1-16B. At 1902, the method 1900 includes providing, from a CPU to a remapping and reshaping module coupled between the CPU and the bus, a memory access request including a requested memory address for accessing a memory of a sub-system coupled to the bus. At 1904, the method 1900 includes comparing, with the remapping and reshaping module, the requested memory address to address matching data including a plurality of addresses. At 1906, the method 1900 includes if the requested memory address does not match any of the plurality of addresses of the address matching data, outputting the requested memory address to the bus from the data reshaping module. At 1908, the method 1900 includes if the requested memory address matches an address from the address matching data, retrieving an adjusted memory address from address adjustment data associated with the address matching data and providing the adjusted memory address to the bus from the address remapping module and reshaping data associated with the adjusted memory address.

Figure 20:
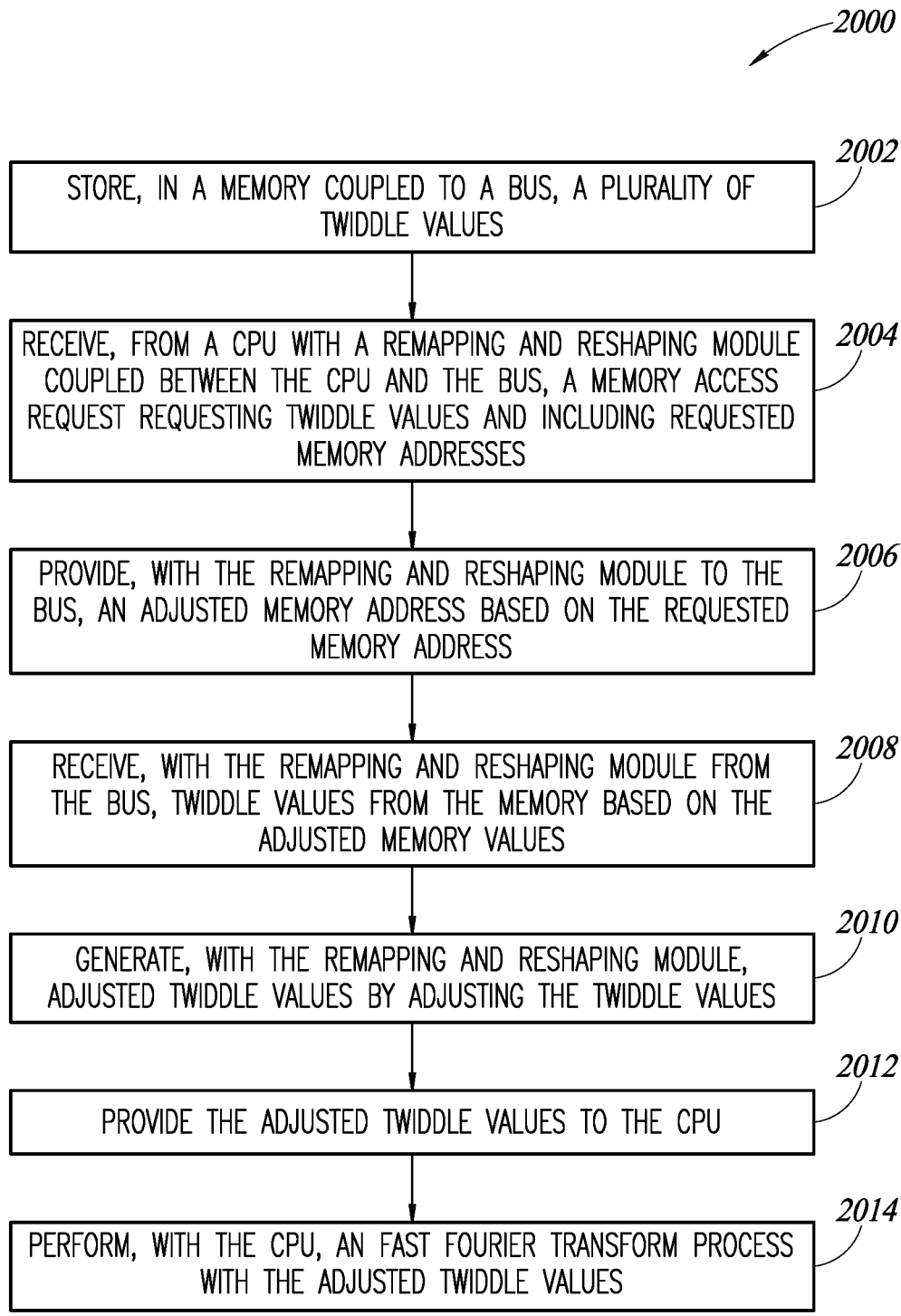
FIG. 20 is a flow diagram of a method, in accordance with one embodiment.

FIG. 20 is a flow diagram of a method 2000, in accordance with one embodiment. The method 2000 can utilize processes, systems, and components described in relation to FIGS. 1-16B. At 2002, the method 2000 includes storing, in a memory coupled to a bus, a plurality of twiddle values. At 2004, the method 2000 includes receiving, from a CPU with a remapping and reshaping module coupled between the CPU and the bus, a memory access request requesting twiddle values and including requested memory addresses at 2006, the method 2000 includes providing, with the remapping and reshaping module to the bus, an adjusted memory address based on the requested memory address. At 2008, the method 2000 includes receiving, with the remapping and reshaping module from the bus, twiddle values from the memory based on the adjusted memory values. At 2010, the method 2000 includes generating, with the remapping and reshaping module, adjusted twiddle values by adjusting the twiddle values. At 2012, the method 2000 includes providing the adjusted twiddle values to the CPU. At 2014, the method 2000 includes performing, with the CPU, an FFT process with the adjusted twiddle values.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
  a CPU;
  a bus;
  a sub-system coupled to the bus;
  address remapping circuitry coupled between the CPU and the bus; and
  a system register coupled to the address remapping circuitry, wherein:
    the CPU, in operation, provides a memory access request to the address remapping circuitry to access a memory of the sub-system via the bus,
    the memory access request includes a requested memory address, wherein the address remapping circuitry, in operation, receives address matching data and address adjustment data from the system register,
    the memory access request includes a data size, wherein the address remapping circuitry, in operation, provides the data size and an update address request to the system register, and
    the system register, in operation, provides the address matching data and the address adjustment data to the address remapping circuitry in response to the update address request.

2. The device of claim 1, wherein the address remapping circuitry includes a comparison circuit, which, in operation, compares the requested memory address to the address matching data.

3. The device of claim 2, wherein if the requested memory address does not match any address from the address matching data then the address remapping circuitry, in operation, provides the requested memory address to the bus, wherein if the requested memory address matches an address from the address matching data then the address remapping circuitry, in operation, provides an adjusted memory address from the address adjustment data to the bus.

4. The device of claim 1, wherein the address remapping circuitry includes a logic circuit.

5. The device of claim 1, wherein the system register, in operation, stores the address matching data, the address adjustment data, a start address associated with the memory, an end address associated with the memory, a buffer size associated with the memory, and a stride associated with the address adjustment data.

6. The device of claim 5, wherein the address matching data includes a plurality of memory address associated with the memory, wherein the address adjustment data includes a plurality of adjusted addresses each associated with one of the memory addresses of the address matching data.

7. The device of claim 1, wherein the system register includes a plurality of sub-registers each associated with a respective memory and including address matching data and address adjustment data associated with the respective memory.

8. The device of claim 1, wherein the memory access request corresponds to reading data from the memory to the CPU.

9. The device of claim 1, wherein the memory access request corresponds to writing data to the memory the CPU.

10. A method, comprising:
providing, from a CPU to an address remapping circuit coupled between the CPU and a bus, a memory access request including a requested memory address for accessing a memory of a sub-system coupled to the bus;
comparing, with the address remapping circuit, the requested memory address to address matching data including a plurality of addresses;
in response to the requested memory address not matching any of the plurality of addresses of the address matching data, providing the requested memory address to the bus from the address remapping circuit; and
in response to the requested memory address matching an address from the address matching data, retrieving an adjusted memory address from address adjustment data associated with the address matching data and providing the adjusted memory address to the bus from the address remapping circuit, wherein the method comprises:
providing, from the address remapping circuit to a system register, an update request responsive to receiving the memory access request; and
receiving, with the address remapping circuit, the address matching data and the address adjustment data from the system register responsive to the update request.

11. The method of claim 10, wherein the update request includes a data size associated with the memory access request.

12. A system, comprising:
a processor;
a bus;
a sub-system coupled to the bus;
a system register; and
address remapping circuitry coupled to the system register, the processor and the bus, wherein the address remapping circuitry, in response to a memory access request received from the processor to access a memory of the sub-system:
compares a memory address of the memory access request to address matching data including a plurality of memory addresses;
in response to the memory address of the memory access request not matching any of the plurality of memory addresses of the address matching data, provides the requested memory address to the bus; and
in response to the memory address of the memory access request matching an address of the plurality of memory addresses of the address matching data, retrieves an adjusted memory address from address adjustment data associated with the address matching data and provides the adjusted memory address to the bus, wherein,
the system register, in operation, stores a start address associated with the memory, an end address associated with the memory, a buffer size associated with the memory, and a stride associated with the address adjustment data.

13. The system of claim 12, wherein the system register, in operation, stores the address matching data and the address adjustment data.

14. The system of claim 12, wherein the address remapping circuitry includes a comparison circuit, which, in operation, compares the memory address of the memory access request to the address matching data.

15. The system of claim 12, wherein the system register includes a plurality of sub-registers each associated with a respective memory and including address matching data and address adjustment data associated with the respective memory.

* * * * *

UNITED STATES PATENT AND TRADEMARK OFFICE
CERTIFICATE OF CORRECTION

| | | |
|---|---|---|
| PATENT NO. | : 12,332,782 B2 | Page 1 of 1 |
| APPLICATION NO. | : 18/188365 | |
| DATED | : June 17, 2025 | |
| INVENTOR(S) | : Loris Luise et al. | |

It is certified that error appears in the above-identified patent and that said Letters Patent is hereby corrected as shown below:

In the Claims

Column 19, Claim 9, Line 20:
"the memory the CPU." should read: --the memory from the CPU.--

Signed and Sealed this
Second Day of September, 2025

Coke Morgan Stewart
*Acting Director of the United States Patent and Trademark Office*